United States Patent
Kundu et al.

(10) Patent No.: US 11,416,548 B2
(45) Date of Patent: Aug. 16, 2022

(54) INDEX MANAGEMENT FOR A DATABASE

(71) Applicant: International Business Machines Corporation, Armonk, NY (US)

(72) Inventors: Ashish Kundu, Yorktown Heights, NY (US); Mukesh K. Mohania, New Delhi (IN); Hoang Tam Vo, Southbank (AU); Zehra N. Sura, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 674 days.

(21) Appl. No.: 16/401,277

(22) Filed: May 2, 2019

(65) Prior Publication Data

US 2020/0349194 A1    Nov. 5, 2020

(51) Int. Cl.
| | | |
|---|---|---|
| *G06F 16/00* | (2019.01) | |
| *G06F 16/901* | (2019.01) | |
| *H04L 9/06* | (2006.01) | |
| *G06F 16/903* | (2019.01) | |
| *H04L 9/00* | (2022.01) | |

(52) U.S. Cl.
CPC ......... *G06F 16/901* (2019.01); *G06F 16/903* (2019.01); *H04L 9/0637* (2013.01); *H04L 9/0643* (2013.01); *H04L 9/50* (2022.05)

(58) Field of Classification Search
None
See application file for complete search history.

(56) References Cited

U.S. PATENT DOCUMENTS

| | | |
|---|---|---|
| 7,827,160 B2 | 11/2010 | Kuhr et al. |
| 2004/0064693 A1 | 4/2004 | Pabla et al. |
| 2009/0187588 A1 | 7/2009 | Thambiratnam et al. |
| 2012/0166401 A1 | 6/2012 | Li et al. |
| 2018/0089041 A1 | 3/2018 | Smith et al. |
| 2018/0337847 A1 | 11/2018 | Li et al. |
| 2020/0065300 A1* | 2/2020 | Yang ............... G06F 16/9024 |
| 2020/0204350 A1* | 6/2020 | Kramer ............. G06Q 20/401 |

FOREIGN PATENT DOCUMENTS

CN    107659429 A    2/2018

OTHER PUBLICATIONS

Anonymous, "Blockchain Transaction Index Mechanism." IP.com Disclosure No. IPCOM000249524D, Publication Date: Mar. 2, 2017.
Désaulniers, "Fully Distributed Indexing over a Distributed Hash Table." In: E. Sabi (ed.). Ubiquitous Networking (UNet) 2017. Lecture Notes in Computer Science, vol. 10542, 2017, pp. 308-318, Springer.

\* cited by examiner

*Primary Examiner* — Tuankhanh D Phan

(57) ABSTRACT

An example operation may include one or more of generating a proposal to perform a ledger operation at a first node, informing one or more second nodes of the proposal, receiving a decision on consensus among the first node and the one or more second nodes for the proposal, and performing the ledger operation at the first node when there is consensus, wherein the ledger operation changes a state database of a ledger of the first node and wherein the state database corresponds to a blockchain stored in the ledger.

20 Claims, 25 Drawing Sheets

150

INDEX MANAGEMENT FOR A DATABASE

TECHNICAL FIELD

This application generally relates to a database storage system, and more particularly, to index management for a database.

BACKGROUND

A centralized database stores and maintains data in a single database (e.g., a database server) at one location. This location is often a central computer, for example, a desktop central processing unit (CPU), a server CPU, or a mainframe computer. Information stored on a centralized database is typically accessible from multiple different points. Multiple users or client workstations can work simultaneously on the centralized database, for example, based on a client/server configuration. A centralized database is easy to manage, maintain, and control, especially for purposes of security because of its single location. Within a centralized database, data redundancy is minimized as a single storing place of all data also implies that a given set of data only has one primary record.

However, a centralized database suffers from significant drawbacks. For example, a centralized database has a single point of failure. In particular, if there are no fault-tolerance considerations and a hardware failure occurs (for example a hardware, firmware, and/or a software failure), all data within the database is lost and work of all users is interrupted. In addition, centralized databases are highly dependent on network connectivity. As a result, the slower the connection, the amount of time needed for each database access is increased. Another drawback is the occurrence of bottlenecks when a centralized database experiences high traffic due to a single location. Furthermore, a centralized database provides limited access to data because only one copy of the data is maintained by the database. As a result, multiple devices cannot access the same piece of data at the same time without creating significant problems or risk overwriting stored data. Furthermore, because a database storage system has minimal to no data redundancy, data that is unexpectedly lost is very difficult to retrieve other than through manual operation from back-up storage. As such, what is needed is a solution that overcomes these drawbacks and limitations.

SUMMARY

One example embodiment provides a system that includes an interface and a processor to communicate with a blockchain network through the interface. The processor is to generate a proposal to perform a ledger operation at a first node, inform one or more second nodes of the proposal through the interface, receive information through the interface indicative of a decision on consensus among the first node and the one or more second nodes for the proposal, and perform the ledger operation at the first node when there is consensus. The ledger operation is to change a state database of a ledger of the first node, and the state database corresponds to a blockchain stored in the ledger. The ledger operation may change an index configuration of the state database. For example, the ledger operation may create an index for an attribute, update an index of an attribute already in the ledger, copy or share an index at the one or more second nodes with the first node, or read or update an index at the one or more second nodes with the first node.

Another example embodiment provides a method that includes one or more of generating a proposal to perform a ledger operation at a first node, informing one or more second nodes of the proposal, receiving a decision on consensus among the first node and the one or more second nodes for the proposal, and performing the ledger operation at the first node when there is consensus, wherein the ledger operation changes a state database of a ledger of the first node and wherein the state database corresponds to a blockchain stored in the ledger.

A further example embodiment provides a non-transitory computer readable medium comprising instructions, that when read by a processor, cause the processor to perform one or more of generate a proposal to perform a ledger operation at a first node, inform one or more second nodes of the proposal, receive a decision on consensus among the first node and the one or more second nodes for the proposal, and perform the ledger operation at the first node when there is consensus, wherein the ledger operation changes a state database of a ledger of the first node and wherein the state database corresponds to a blockchain stored in the ledger.

DETAILED DESCRIPTION

Figure 1A:
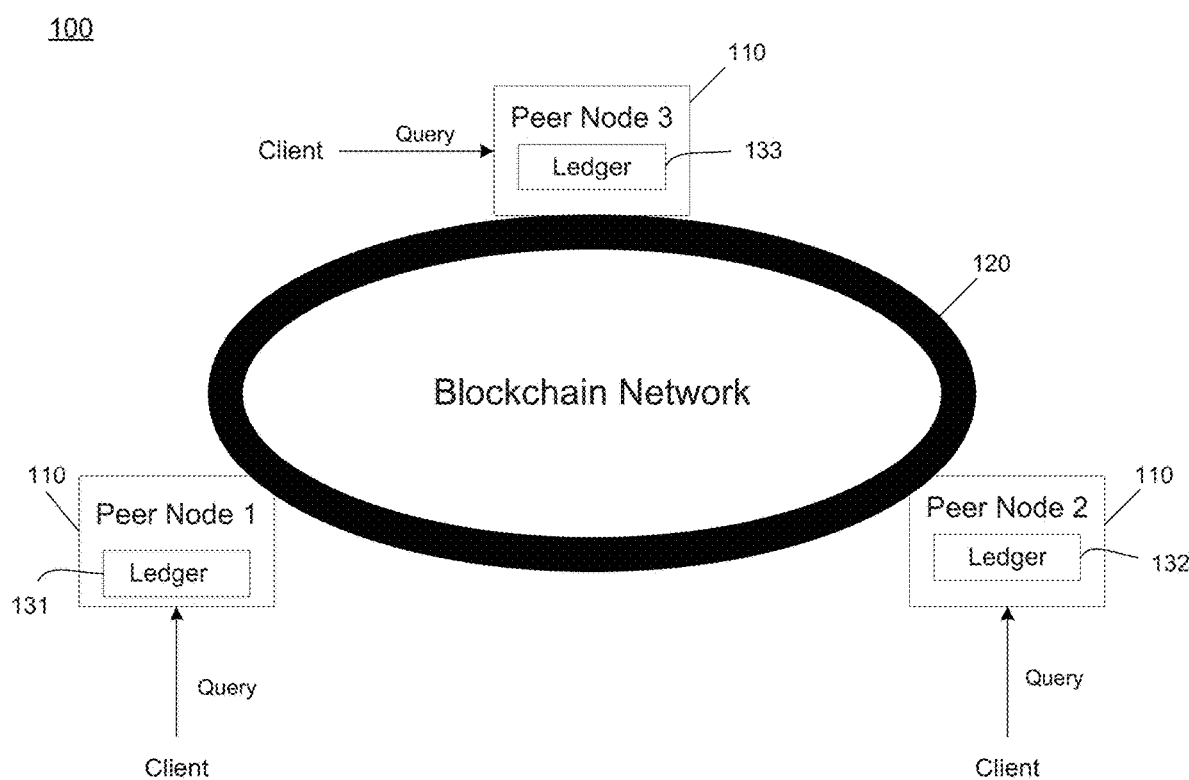
FIG. 1A illustrates a network diagram of a system including a database, according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined or removed in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined or removed in any suitable manner in one or more embodiments.

In addition, while the term "message" may have been used in the description of embodiments, the application may be applied to many types of networks and data. Furthermore, while certain types of connections, messages, and signaling may be depicted in exemplary embodiments, the application is not limited to a certain type of connection, message, and signaling.

Example embodiments provide methods, systems, components, non-transitory computer readable media, devices, and/or networks, which manage ledger operations using a consensus protocol for one or more peer nodes in a decentralized database system. The decentralized database system may include, for example, a blockchain network. The indexes may be included in the state database portion of the ledger of each node and may be managed using smart contracts and/or one or more other blockchain techniques. In one embodiment, the consensus protocol controls the creation and updating indexes so that there is coordination and consistency among the peer nodes for one or more predetermined metrics. As a result, query processing, data privacy, and overall blockchain network performance may be improved.

In one embodiment, the decentralized database system (e.g., blockchain) is a distributed storage system which includes nodes that communicate with each other. The decentralized database includes an append-only immutable data structure resembling a distributed ledger capable of maintaining records between mutually untrusted parties. The untrusted parties are referred to herein as peers or peer nodes. Each peer maintains a copy of the database records and no single peer can modify the database records without a consensus being reached among the distributed peers. For example, the peers may execute a consensus protocol to validate blockchain storage transactions, group the storage transactions into blocks, and build a hash chain over the blocks. This process forms the ledger by ordering the storage transactions, as is necessary, for consistency. In various embodiments, a permissioned and/or a permissionless blockchain can be used. In a public or permission-less blockchain, anyone can participate without a specific identity. Public blockchains often involve native cryptocurrency and use consensus based on various protocols such as Proof of Work (PoW). On the other hand, a permissioned blockchain database provides secure interactions among a group of entities which share a common goal but which do not fully trust one another, such as businesses that exchange funds, goods, information, and the like.

This application can utilize a blockchain that operates arbitrary, programmable logic, tailored to a decentralized storage scheme and referred to as "smart contracts" or "chaincodes." In some cases, specialized chaincodes may exist for management functions and parameters which are referred to as system chaincode. The application can further utilize smart contracts that are trusted distributed applications which leverage tamper-proof properties of the blockchain database and an underlying agreement between nodes, which is referred to as an endorsement or endorsement policy. Blockchain transactions associated with this application can be "endorsed" before being committed to the blockchain while transactions, which are not endorsed, are disregarded. An endorsement policy allows chaincode to specify endorsers for a transaction in the form of a set of peer nodes that are necessary for endorsement. When a client sends the transaction to the peers specified in the endorsement policy, the transaction is executed to validate the transaction. After validation, the transactions enter an ordering phase in which a consensus protocol is used to produce an ordered sequence of endorsed transactions grouped into blocks.

In one embodiment, consensus for purposes of committing a new block to the blockchain may be implemented as a protocol or layer in the blockchain network. This protocol or network layer governs the exchange of information, messages, and transactions between and among the peer nodes, ordering service nodes, committing nodes, and/or other entities for purposes of reaching consensus. Consensus may involve each (validating) peer node performing a number of operations, including but not limited to chaincode invocation, transaction execution, verification, and validation. The peer nodes relay their validation results with respect to a proposed transaction to one another. When the results are the same or consistent across the nodes, as determined by a consensus algorithm or policy, then agreement is reached (e.g., there is consensus) and a new block including the proposed (now confirmed) transaction is appended to the blockchains stored in the ledgers of the peer nodes.

As indicated above, the network may include various types of nodes, which serve as the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser (e.g., peer), and broadcasts transaction-proposals to an ordering service (e.g., ordering node). Another type of node is a peer node which can receive client submitted transactions, commit the transactions and maintain a state and a copy of the ledger of blockchain transactions. Peers can also have the role of an endorser, although it is not a requirement. An ordering-service-node or orderer is a node running the communication service for all nodes, and which implements a delivery guarantee, such as a broadcast to each of the peer nodes in the system when committing transactions and modifying a world state of the blockchain, which is another name for the initial blockchain transaction which normally includes control and setup information.

This application can utilize a ledger that is a sequenced, tamper-resistant record of all state transitions of a blockchain. State transitions may result from chaincode invocations (i.e., transactions) submitted by participating parties (e.g., client nodes, ordering nodes, endorser nodes, peer nodes, etc.). Each participating party (such as a peer node) can maintain a copy of the ledger. A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain.

This application can utilize a chain that is a transaction log which is structured as hash-linked blocks. Each block contains a sequence of N transactions, where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents or is based on every transaction on the chain that has come before it, making it possible to ensure that all peer nodes are in a consistent and trusted state. The chain may be stored on a peer node file system (e.g., local, attached storage, cloud, etc.), efficiently supporting the append-only nature of the blockchain workload.

The current state of the immutable ledger represents the latest values for all keys that are included in the chain transaction log. Since the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated if needed) upon peer node startup, and before transactions are accepted. Examples of the state database and its relation to a blockchain are described in greater detail below.

Some benefits of the instant solutions described and depicted herein include managing the state database indexes of peer node ledgers so that they are coordinated and consistent relative to one or more metrics. This may be accomplished by submitting the ledger indexes to a consensus protocol among the peer nodes of the blockchain network. The consensus protocol may also be used to obtain agreement among the peer nodes as to splitting a vertex or merging two vertices. If consensus cannot be obtained by the peer nodes on one or more of the metrics, the consensus protocol may be used to obtain agreement on the efficiency parameter of the indexes, for example, with respect to latency and/or memory usage.

One or more embodiments described herein may also improve the functionality of a computer in various ways. For example, managing ledger operations based on a consensus protocol enhances the protection of information stored in the state database (e.g., blockchain). This is especially the case when the ledger operations relate to index management. In one or more embodiments, the consensus protocol ensures that certain metrics or features of the state databases of the peer nodes are coordinated and consistent (e.g., breadth, height, fan-out, etc.), even though there may be differences with respect to other metrics or features. Also, consensus-based indexing also overcomes any problems relating to non-uniform query processing and transaction costs. In addition, consensus ensures that privacy policies of individual nodes, and more generally across the entire network, are satisfied so that there are no data breaches. Additionally, submitting proposed index management operations to consensus allows a new form of information (e.g., a consensus-approved index) to be stored in the ledgers of the peer nodes.

FIG. 1A illustrates a logic network diagram of a blockchain network 100 according to example embodiments. Referring to FIG. 1A, the network 100 includes a plurality of peer nodes 110 that communicate with one another over peer-to-peer communication links, conceptually represented by an oval. For illustrative purposes, only three peer nodes are shown with the understanding that the blockchain network 120 may include a different number of nodes, and in some implementations many more nodes. The peer nodes store copies of ledgers 131, 132, and 133, respectively, which include a log of the transactions stored in the blockchain network, as previously described. The transactions may be managed by smart contracts at each node and may be queried by one or more clients (e.g., client applications) to retrieve or otherwise provide access to information stored on the blockchain.

Figure 1B:
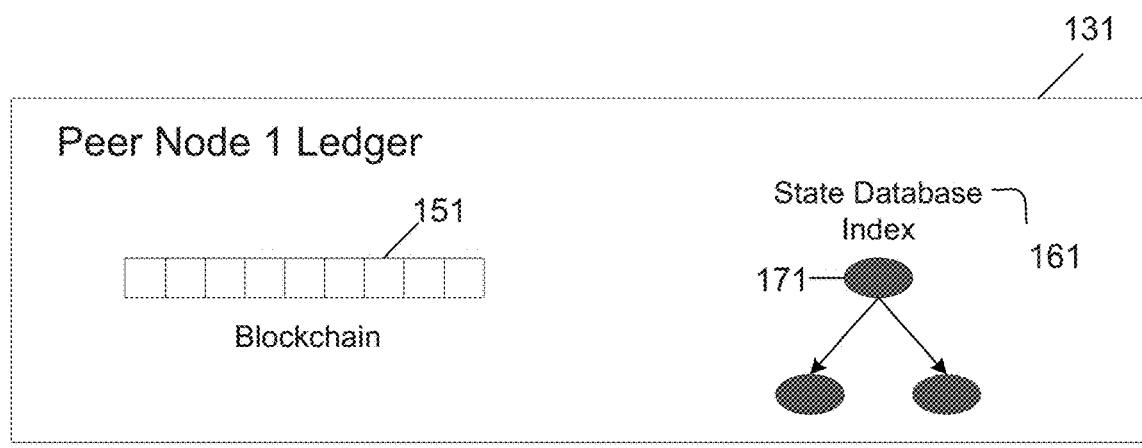
FIG. 1B illustrates a network diagram of a component operating with a database, according to example embodiments.
Figure 1B:
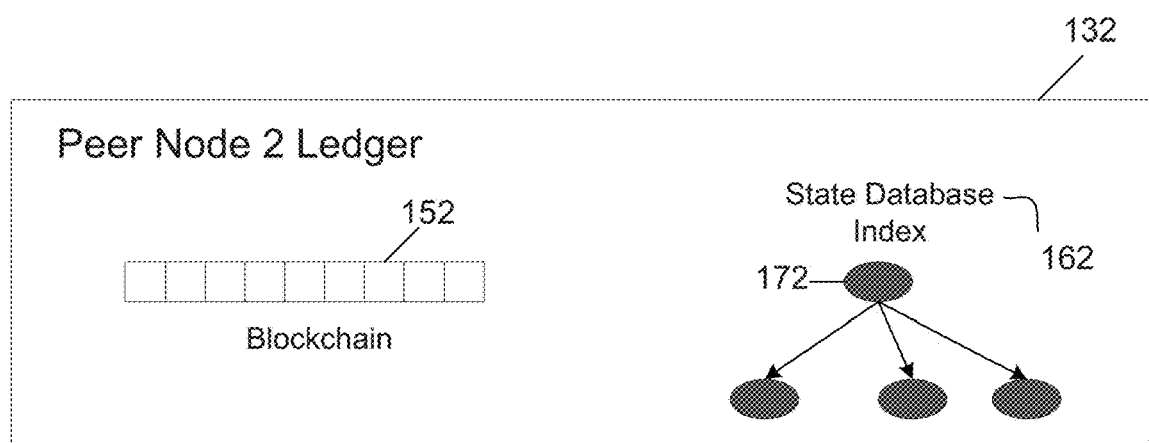
Figure 1B:
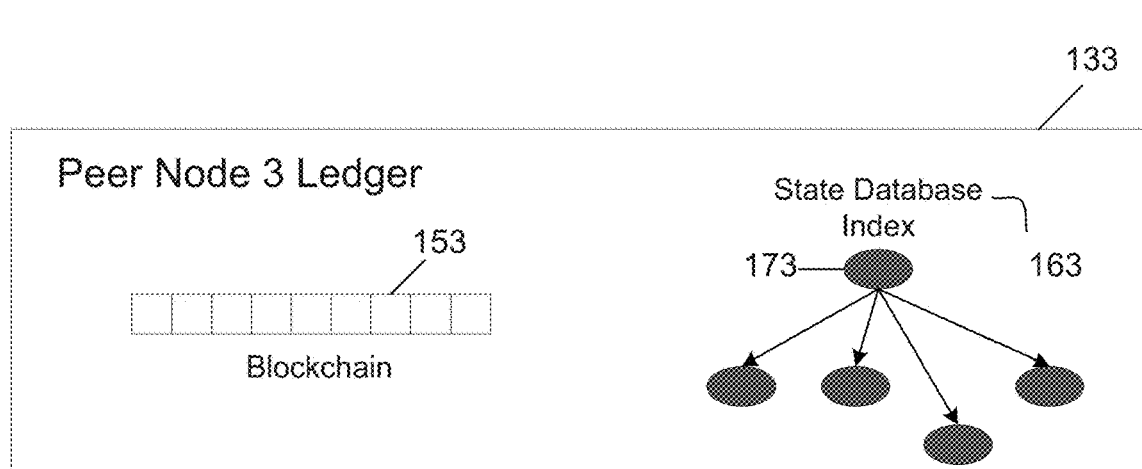

FIG. 1B illustrates another logic network diagram 150 of the ledgers 131, 132, and 133 of the peer nodes shown in FIG. 1, according to example embodiments. Referring to FIG. 1B, the ledgers of the peer nodes include respective copies of the blockchain 151, 152, and 153 and state databases 161, 162, and 163 storing indexes for the blockchains. The configuration of indexes in each state database may be expressed as a plurality of state nodes that reside at various levels and which are related through one or more logical links. The state nodes (or indexes) of the state databases may be determined, for example, based on ledger queries and/or smart contracts implementing various policies or rules applied based on the information (e.g., assets, transactions, attributes, etc.) stored in their corresponding blockchains.

The index configurations 171, 172, and 173 of the state databases may be the same or different. In FIG. 1B, the index configurations 171, 172, and 173 in Nodes 1, 2, and 3 are different, indicating that information in their corresponding blockchains may have some variations. As indicated, the state node in each index configuration may correspond to an index. A different index may be formed for different attributes of the information stored in the blockchain. For example, as discussed in detail below, one index in the index configuration may correspond to attribute X having associated values related to the attribute. The index configuration in each node, thus, provides a representation of the current (or world) state of its corresponding blockchain and may be used by smart contracts to respond to client queries. These index configurations help to improve the efficiency of processing queries and increase the privacy of information stored in the blockchains, especially in the manner performed by the embodiments described herein.

Figure 1C:
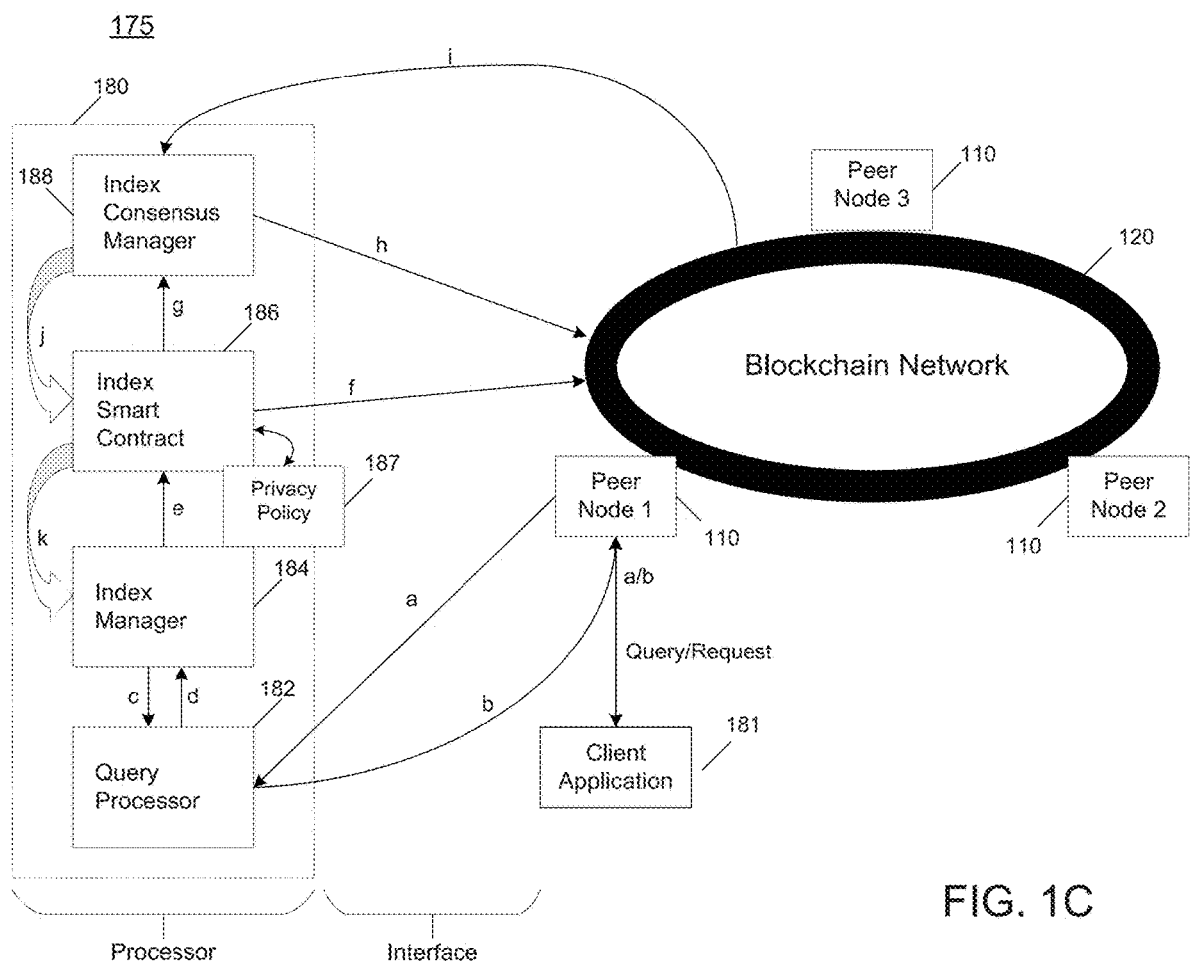
FIG. 1C illustrates an embodiment to perform index management in a blockchain network.

FIG. 1C shows an embodiment of a system 180 to create, update, share, or perform other operations to manage indexes in the state database ledgers of the peer nodes. Referring to FIG. 1C, the system 180 includes a query processor 182, an index manager 184, an index smart contract 186, and an index consensus manager 188. In one embodiment, all or a portion of these features may be included in, performed by, or coupled to each of the peer nodes (e.g., N1, N2, N3, etc.) in the blockchain network. As shown by the arrows, these features interact with one another and other peer nodes in order to manage the ledger indexes. The query processor, index manager, index smart contract, and index consensus manager may be implemented by logic, which includes but is not limited to software, hardware, or both, resident on one or more computers or other devices that are physically connected in the blockchain network.

The query processor 182 receives queries (path a) from one or more client applications 181. The client applications 181 are associated with a node (e.g., peer Node 1) that includes or is coupled to the query processor 182, and may invoke chaincode to generate the query. The query processor 182 searches through the ledger and returns results (path b) to the client application that sent the query. The query results may correspond to information (e.g., relating to transactions) included in one or more blocks of the blockchain stored at the node. The query processor 182 may perform this function using one or more of the indexes in the state database of the ledger, which is beneficial because these indexes represent the current world state of the blockchain.

The index manager 184 retrieves information based on one or more indexes in the state database, and provides this information to the query processor 182 in response to a query. As will be discussed in greater detail, the index manager 184 may also initiate the creation or update of an index (or other ledger management operation) in the state database, either automatically or in response to a command. The creation or update of an index may be initiated, for example, based on the occurrence of a condition. The condition may be one or more queries from the query processor or another condition. In one case, when queries are received that reference a new attribute or a common or repetitively searched-for attribute, the index manager 184 may initiate propose the creation or update of an index in the ledger. However, in accordance with one or more embodiments, the creation or update of the index is not performed unless a consensus protocol is satisfied relative to other peer nodes in the network. Also, this consensus protocol may be subject to or otherwise communicate with a privacy policy to ensure that information intended to be kept private is not made available to other nodes or network entities. The exchange of information between the query processor 182 and the index manager 184 may take place along paths c and d.

The index smart contract 186 controls operations that are to be performed in order to submit a proposed ledger management operation (e.g., creation, update, sharing, etc., of an index) and/or related information to other peer nodes in the network. The proposed operation may be received from the index manager 184 through path e. In one embodiment, the index smart contract 186 checks with a privacy policy 187 to determine whether the proposed management operation is even allowed, for example, given specific restrictions and other conditions in the privacy policy. The privacy policy may be determined by one or more asset/ transaction parties, one or more owners of the peer nodes or client applications, or based on other policy information relating to implementation of the blockchain. If, for example, the proposed operation is not prohibited by the privacy policy, index smart contract 186 may exchange information with other peer nodes (path f) and submit the proposed management operation to the index consensus manager 188 (path g).

The index consensus manager 188 exchanges information with the peer nodes in order to determine whether there is agreement (e.g., consensus) as to the proposed index management operation. For example, the consensus manager may send parameters, values, and/or other details concerning the creation of an index in Node 1 (path h) and receives decisions back from the nodes (path i). The consensus manager 188 determines whether there is consensus to the proposed index management operation and/or its associated parameters or values based on the decisions, one or more policies, and/or operations performed by the index smart contract. The decision on consensus is sent to the index smart contract 186 and then to the index manager 184 along paths j and k, respectively. When there is consensus, the index manager 184 creates, updates, shares, or performs another operation corresponding to the proposed index management operation, which has now received consensus. Example embodiments of consensus-based index management among the nodes in the blockchain network are discussed herein.

In accordance with one or more embodiments, the index consensus manager 188 may operate based on smart contracts or other protocols different from those used to obtain consensus for purposes of adding a new block to the blockchain. In one embodiment, the index consensus manager 188 may be implemented by a protocol or network layer that is entirely or partially implemented by smart contracts of the network nodes and associated policy information. In one embodiment, a peer node may be designated as a leader node for purposes of interacting with other peer nodes for reaching consensus on the creation, updating, and/or sharing of indexes and/or other for performing other operations relating to index management.

Figure 2A:
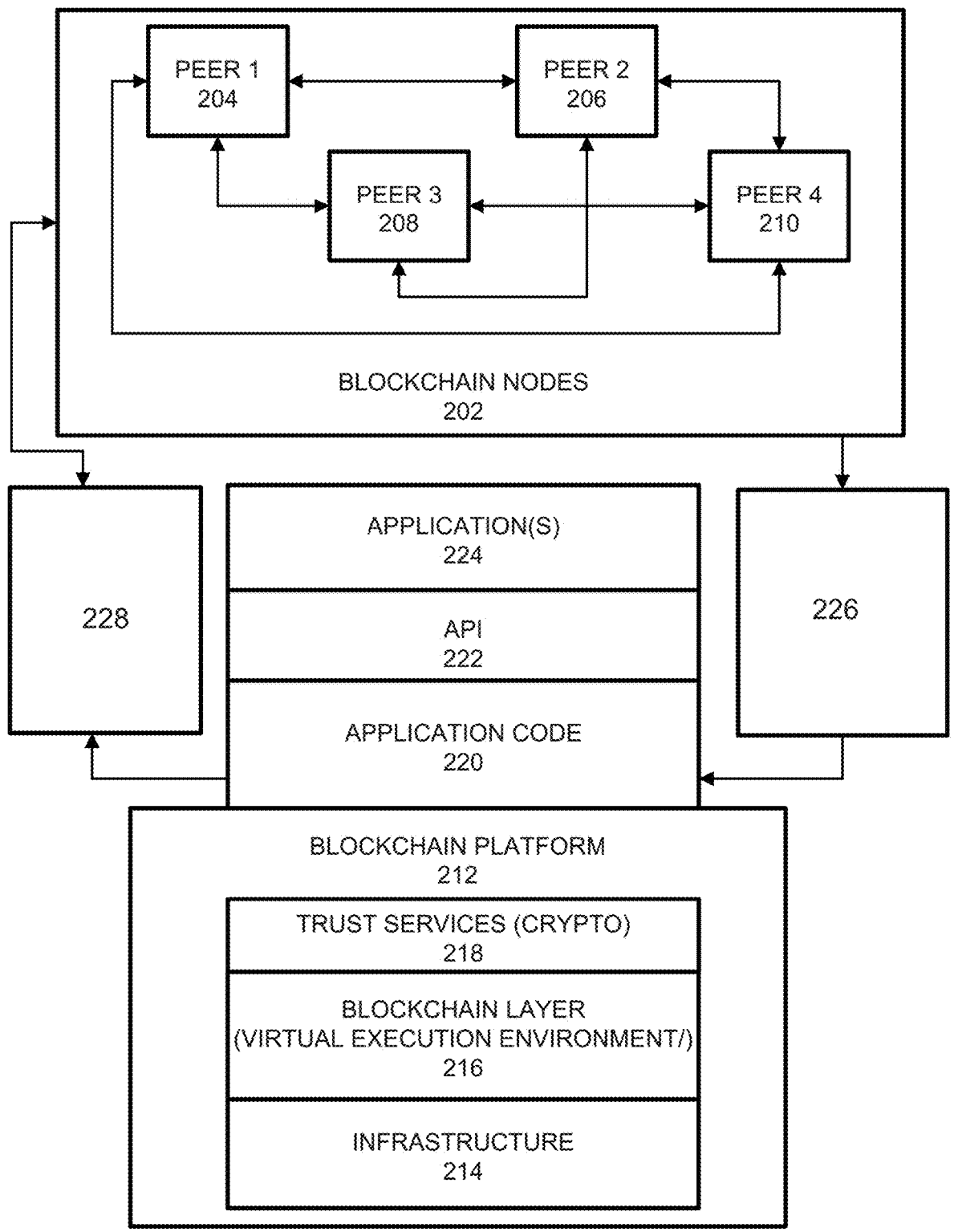
FIG. 2A illustrates an example blockchain architecture configuration, according to example embodiments.

FIG. 2A illustrates a blockchain architecture configuration 200, according to example embodiments. Referring to FIG. 2A, the blockchain architecture 200 may include certain blockchain elements, for example, a group of blockchain nodes 202. The blockchain nodes 202 may include one or more nodes 204-210 (these four nodes are depicted by example only). These nodes participate in a number of activities, such as blockchain transaction addition and validation process (consensus). One or more of the blockchain nodes 204-210 may endorse transactions based on endorsement policy and may provide an ordering service for all blockchain nodes in the architecture 200. A blockchain node may initiate a blockchain authentication and seek to write to a blockchain immutable ledger stored in blockchain layer 216, a copy of which may also be stored on the underpinning physical infrastructure 214. The blockchain configuration may include one or more applications 224 which are linked to application programming interfaces (APIs) 222 to access and execute stored program/application code 220 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 204-210.

The blockchain base or platform 212 may include various layers of blockchain data, services (e.g., cryptographic trust services, virtual execution environment, etc.), and underpinning physical computer infrastructure that may be used to receive and store new transactions and provide access to auditors seeking to access data entries. The blockchain layer 216 may expose an interface that provides access to the virtual execution environment necessary to process the program code and engage the physical infrastructure 214. Cryptographic trust services 218 may be used to verify transactions such as asset exchange transactions and keep information private.

The blockchain architecture configuration of FIG. 2A may process and execute program/application code 220 via one or more interfaces exposed, and services provided, by blockchain platform 212. The code 220 may control blockchain assets. For example, the code 220 can store and transfer data, and may be executed by nodes 204-210 (e.g., including Nodes 1 to 3 in FIGS. 1A and 1C) in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger. For example, information 226 may include blockchain queries, index management proposals, and/or information relating to the creation, updating, sharing, or other operations for a state database index. In one embodiment, information 226 relates to obtaining consensus among the nodes respecting a ledger operation that changes the configuration of an index at one or more nodes.

The program/application code 220 performs one or more operations based on information 226 and outputs information 228, which may include, for example, transmission or processing of consensus decisions by one or more nodes on a proposed ledger operation involving a state database index, designations of or changes to one or more parameters or values of a proposed index, results from privacy policy decisions relating to a proposed index, and/or other information relating to the systems, methods, and other embodiments described herein. The processing of information 226 to produce information 228 may be performed, for example, by one or more processing entities (e.g., virtual machines) included in the blockchain layer 216. The physical infrastructure 214 may be utilized to retrieve any of the data or information described herein.

A smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details.

Figure 2B:
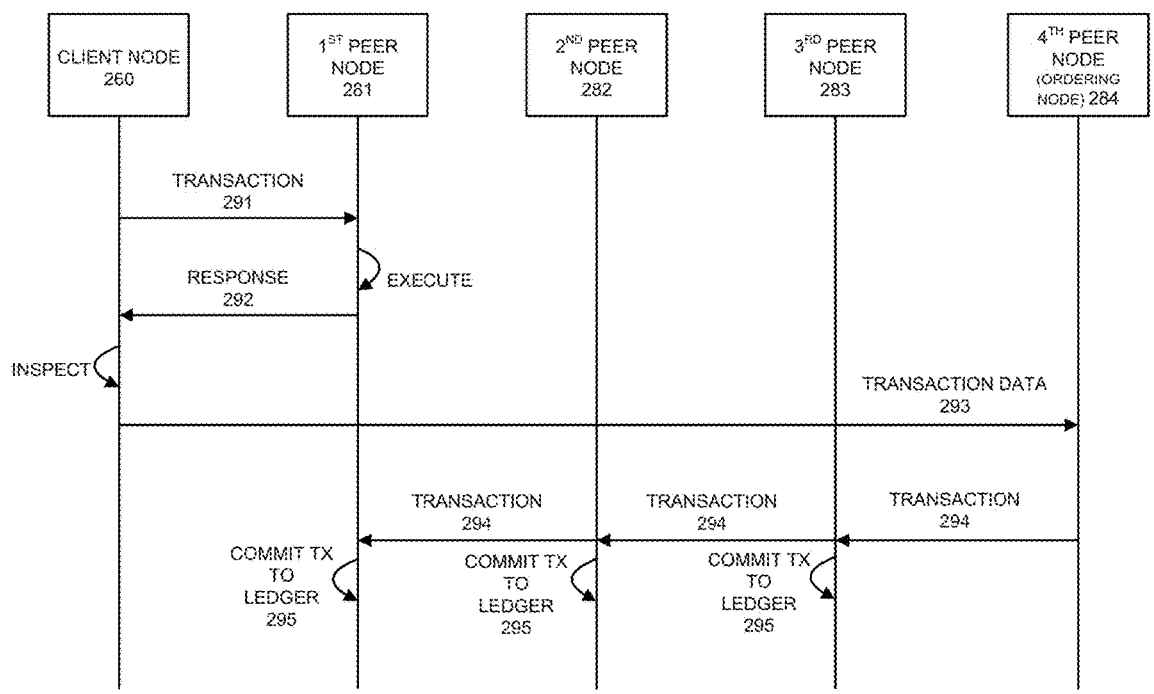
FIG. 2B illustrates a blockchain transactional flow, according to example embodiments.

FIG. 2B illustrates an example of a blockchain transactional flow 250 between nodes of the blockchain in accordance with an example embodiment. Referring to FIG. 2B, the transaction flow may include a transaction proposal 291 sent by an application client node 260 to an endorsing peer node 281. The endorsing peer 281 may verify the client signature and execute a chaincode function to initiate the transaction. The output may include the chaincode results, a set of key/value versions that were read in the chaincode (read set), and the set of keys/values that were written in chaincode (write set). The proposal response 292 is sent back to the client 260 along with an endorsement signature, if approved. The client 260 assembles the endorsements into a transaction payload 293 and broadcasts it to an ordering service node 284. The ordering service node 284 then delivers ordered transactions as blocks to all peers 281-283 on a channel. Before committal to the blockchain, each peer 281-283 may validate the transaction. For example, the peers may check the endorsement policy to ensure that the correct allotment of the specified peers have signed the results and authenticated the signatures against the transaction payload 293.

Referring again to FIG. 2B, the client node 260 initiates the transaction 291 by constructing and sending a request to the peer node 281, which is an endorser. The client 260 may include an application leveraging a supported software development kit (SDK), which utilizes an available API to generate a transaction proposal. The proposal is a request to invoke a chaincode function so that data can be read and/or written to the ledger (i.e., write new key value pairs for the assets). The SDK may serve as a shim to package the transaction proposal into a properly architected format (e.g., protocol buffer over a remote procedure call (RPC)) and take the client's cryptographic credentials to produce a unique signature for the transaction proposal.

In response, the endorsing peer node 281 may verify (a) that the transaction proposal is well formed, (b) the transaction has not been submitted already in the past (replay-attack protection), (c) the signature is valid, and (d) that the submitter (client 260, in the example) is properly authorized to perform the proposed operation on that channel. The endorsing peer node 281 may take the transaction proposal inputs as arguments to the invoked chaincode function. The chaincode is then executed against a current state database to produce transaction results including a response value, read set, and write set. However, no updates are made to the ledger at this point. In 292, the set of values, along with the endorsing peer node's 281 signature is passed back as a proposal response 292 to the SDK of the client 260 which parses the payload for the application to consume.

In response, the application of the client 260 inspects/verifies the endorsing peers signatures and compares the proposal responses to determine if the proposal response is the same. If the chaincode only queried the ledger, the application would inspect the query response and would typically not submit the transaction to the ordering node service 284. If the client application intends to submit the transaction to the ordering node service 284 to update the ledger, the application determines if the specified endorsement policy has been fulfilled before submitting (i.e., did all peer nodes necessary for the transaction endorse the transaction). Here, the client may include only one of multiple parties to the transaction. In this case, each client may have their own endorsing node, and each endorsing node will need to endorse the transaction. The architecture is such that even if an application selects not to inspect responses or otherwise forwards an unendorsed transaction, the endorsement policy will still be enforced by peers and upheld at the commit validation phase.

After successful inspection, in step 293 the client 260 assembles endorsements into a transaction and broadcasts the transaction proposal and response within a transaction message to the ordering node 284. The transaction may contain the read/write sets, the endorsing peers signatures and a channel ID. The ordering node 284 does not need to inspect the entire content of a transaction in order to perform its operation, instead the ordering node 284 may simply receive transactions from all channels in the network, order them chronologically by channel, and create blocks of transactions per channel.

The blocks of the transaction are delivered from the ordering node 284 to all peer nodes 281-283 on the channel. The transactions 294 within the block are validated to ensure any endorsement policy is fulfilled and to ensure that there have been no changes to ledger state for read set variables since the read set was generated by the transaction execution. Transactions in the block are tagged as being valid or invalid. Furthermore, in step 295 each peer node 281-283 appends the block to the channel's chain, and for each valid transaction the write sets are committed to current state database. An event is emitted, to notify the client application that the transaction (invocation) has been immutably appended to the chain, as well as to notify whether the transaction was validated or invalidated.

Figure 3A:
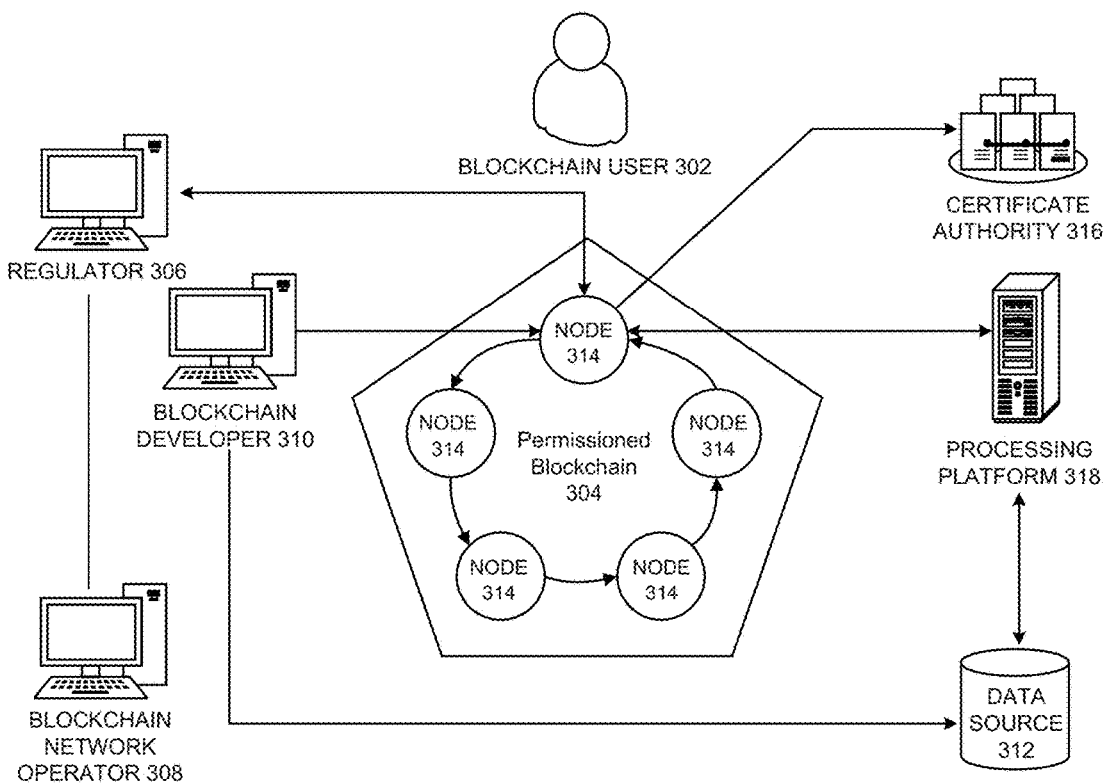
FIG. 3A illustrates a permissioned network, according to example embodiments.

FIG. 3A illustrates an example of a permissioned blockchain network 300, which features a distributed, decentralized peer-to-peer architecture. In this example, a blockchain user 302 may initiate a transaction to the permissioned blockchain 304. In this example, the transaction can be a deploy, invoke, or query, and may be issued through a client-side application leveraging an SDK, directly through an API, etc. Networks may provide access to a regulator 306, such as an auditor. A blockchain network operator 308 manages member permissions, such as enrolling the regulator 306 as an "auditor" and the blockchain user 302 as a "client". An auditor could be restricted only to querying the ledger whereas a client could be authorized to deploy, invoke, and query certain types of chaincode.

A blockchain developer 310 can write chaincode and client-side applications. The blockchain developer 310 can deploy chaincode directly to the network through an interface. To include credentials from a traditional data source 312 in chaincode, the developer 310 could use an out-of-band connection to access the data. In this example, the blockchain user 302 connects to the permissioned blockchain 304 through a peer node 314. Before proceeding with any transactions, the peer node 314 retrieves the user's enrollment and transaction certificates from a certificate authority 316, which manages user roles and permissions. In some cases, blockchain users must possess these digital certificates in order to transact on the permissioned blockchain 304. Meanwhile, a user attempting to utilize chaincode may be required to verify their credentials on the traditional data source 312. To confirm the user's authorization, chaincode can use an out-of-band connection to this data through a traditional processing platform 318.

Figure 3B:
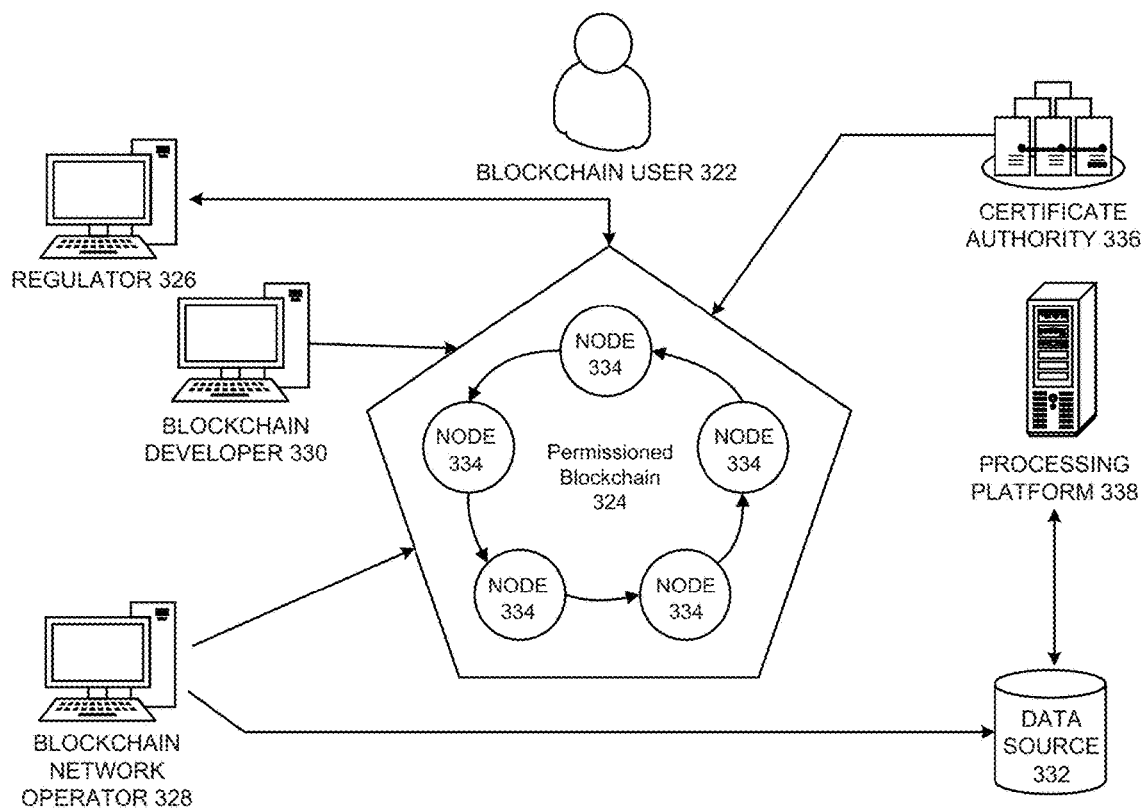
FIG. 3B illustrates another permissioned network, according to example embodiments.

FIG. 3B illustrates another example of a permissioned blockchain network 320, which features a distributed, decentralized peer-to-peer architecture. In this example, a blockchain user 322 may submit a transaction to the permissioned blockchain 324. In this example, the transaction can be a deploy, invoke, or query, and may be issued through a client-side application leveraging an SDK, directly through an API, etc. Networks may provide access to a regulator 326, such as an auditor. A blockchain network operator 328 manages member permissions, such as enrolling the regulator 326 as an "auditor" and the blockchain user 322 as a "client". An auditor could be restricted only to querying the ledger whereas a client could be authorized to deploy, invoke, and query certain types of chaincode.

A blockchain developer 330 writes chaincode and client-side applications. The blockchain developer 330 can deploy chaincode directly to the network through an interface. To include credentials from a traditional data source 332 in chaincode, the developer 330 could use an out-of-band connection to access the data. In this example, the blockchain user 322 connects to the network through a peer node 334. Before proceeding with any transactions, peer node 334 retrieves the user's enrollment and transaction certificates from certificate authority 336. In some cases, blockchain users must possess these digital certificates in order to transact on the permissioned blockchain 324. A user attempting to utilize chaincode may be required to verify their credentials on the traditional data source 332. To confirm the user's authorization, chaincode can use an out-of-band connection to this data through a traditional processing platform 338.

Figure 4:
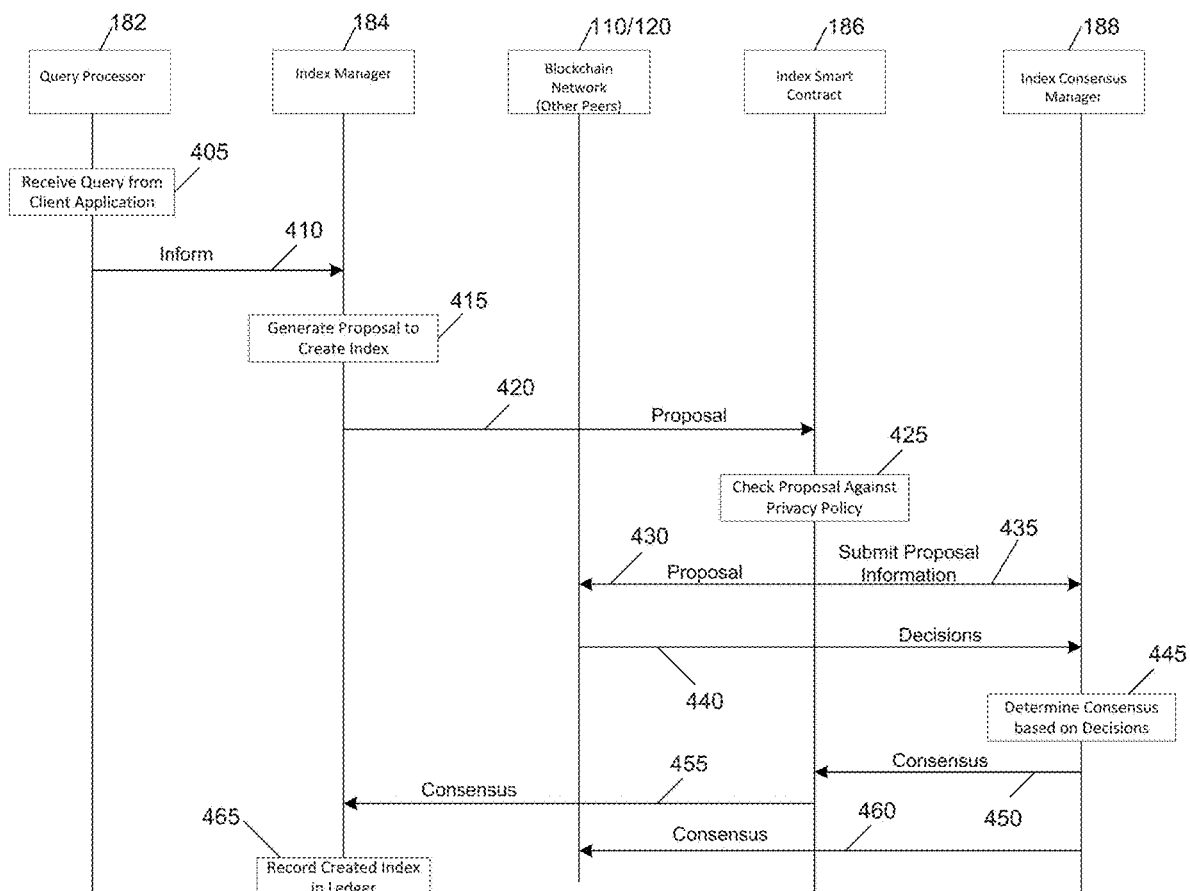
FIG. 4 illustrates a system messaging diagram, according to example embodiments.

FIG. 4 illustrates a messaging diagram 400 for processing a proposed ledger (e.g., index) management operation in a blockchain network, according to example embodiments. For illustrative purposes, the messaging diagram includes messaging between and among the features in the system of FIG. 1C, but may be performed by different system in another embodiment.

Referring to FIG. 4, the system diagram 400 includes, at 405, receiving a query from a client application 181 at a query processor 182 of a peer node, e.g., Node 1. The query processor 182 sends a message 410 to the index manager 184 to provide notification of the query. The query processor 182 may perform this function, for example, every time a query is received or when a query is received that is new or includes new, common, or repetitively used attributes. The index manager 184 determines, at 415, whether to generate a proposal to create, update, share, or perform another operation relating to an index in the ledger. For example, the index manager 184 may determine to generate a proposal to create an index for a new attribute (X) based on conditions or policies, and/or when the query includes one or more new or common or repetitively used attribute.

The index manager 184, at 420, sends a message corresponding to the proposal to the index smart contact 186. The index smart contract 186 checks the proposal against a privacy policy at 425. Also, at 430, the index smart contract 186 sends corresponding information on the index to other peer nodes in the blockchain network. The other nodes may check their privacy policies and/or perform their smart contracts to determine, for example, whether those nodes already have an index for attribute X, whether the values or parameters of their indexes are different from the values or parameters of the proposed index to be added to Node 1, and/or to determine other information involved in consensus. At 435, the index smart contact 186 sends similar information on the proposal (e.g., whether Node 1 has a privacy policy prohibiting the index, the values or parameters associated with the index, and/or other information) to index consensus manager 188.

The index consensus manager 188, at 440, receives the receives the decisions and/or other information relating to privacy, values, parameters, etc., from the other nodes, and, at 445, makes a decision as to whether there is consensus for Node 1 to create an index for attribute X as proposed. This decision may be made by comparing the decisions and other information from all nodes (including Node 1). If there are discrepancies (e.g., if the values or parameters for the proposed index to be created in Node 1 differs from the values or parameters of the index of attribute X in other nodes, if there is a conflict of privacy, etc.), then the index consensus manager 188 may perform additional processing and messaging, with the index smart contract 186 and/or the other peer nodes, until a final decision on consensus is made. During this time, the index smart contract 186 may make modifications to the creation of the index proposed for creation at Node 1.

At 450, the index consensus manager 188 informs the index smart contract 186 of the consensus decision. At 455, the index smart contract 186 informs the index manager 184, which then creates the index based on agreed-upon parameters when there is consensus or terminates the operation when there is no consensus. At 460, the index smart contract 186 (or alternatively the consensus manager 188) may inform the other peer nodes that consensus has been reached regarding the create, update, sharing, etc., of an index for attribute X in Node 1. At 465, the index manager 184 records the index for attribute X in the state database of the ledger for Node 1. Operation 465 may occur before or after messaging 460.

Index Management

In accordance with one or more embodiments, index management may be performed for ledgers at peer nodes in a blockchain network. This may be accomplished, in whole or part, by a smart contract at each peer node and a consensus protocol implemented to ensure agreement among the nodes as to the management of indexes in the ledgers of the nodes.

The ledger at each peer node includes a blockchain and a state database.

The blockchain may include a plurality of blocks that are cryptographically linked together, with each block including entries, transactions, and/or other information, as well as metadata and a reference to the previous block. Hash values may be generated and incorporated into blocks for all or a portion of these features, thus forming an append-only, sequenced immutable chain of hash-linked blocks for protecting the validity and authenticity of the data against malicious threats.

The state database stores information indicating the current (or world) state of the blockchain. The information may include an indexed representation of the transactions in the blockchain and the latest key values (e.g., private, public, or private-public key pair) for decrypting the transactions, entries, etc., in the blockchain. An index of the state database may therefore be used to perform queries of the blockchain, in order to access information stored in the blockchain. Using an index alleviates having to search through every row of the state database, thereby allowing the queries to be performed faster and more efficiently.

Because the state database includes an index of the blockchain transactions, the index can therefore be regenerated from the blockchain at any time. In one implementation, logic at a corresponding node may generate the index of the state database for the blockchain at predetermined times, at start-up, for recovery purposes, and/or under other circumstances. The state database may be updated by the node logic when new blocks are committed to the blockchain, including any new or updated key information.

The state database may be implemented as a LevelDB, a CouchDB, or another database, including but not limited to one that combines features from LevelDB and CouchDB databases. The LevelDB is the default key/value state database embedded in the peer node. CouchDB is an external state database which can store any data that is modeled in chaincode (including but not limited to default key/values), and also enables rich query against the chaincode data, when chaincode values (e.g., assets) are modeled as JavaScript Object Notation (JSON) data. Both LevelDB and CouchDB support core chaincode operations such as getting and setting a key (asset), and querying based on keys. Keys may be queried by range, and composite keys may be modeled to enable equivalence queries against multiple parameters. For example, a composite key of (owner, asset id) can be used to query all assets owned by a certain entity. These key-based queries may be used for read-only queries against the ledger, as well as in transactions that update the ledger. Also, using CouchDB JSON query language within chaincode, complex rich queries may be performed against chaincode data values. These and other types of queries may be used to determine what transactions and/or other information is on the ledger blockchain.

Figure 7A:
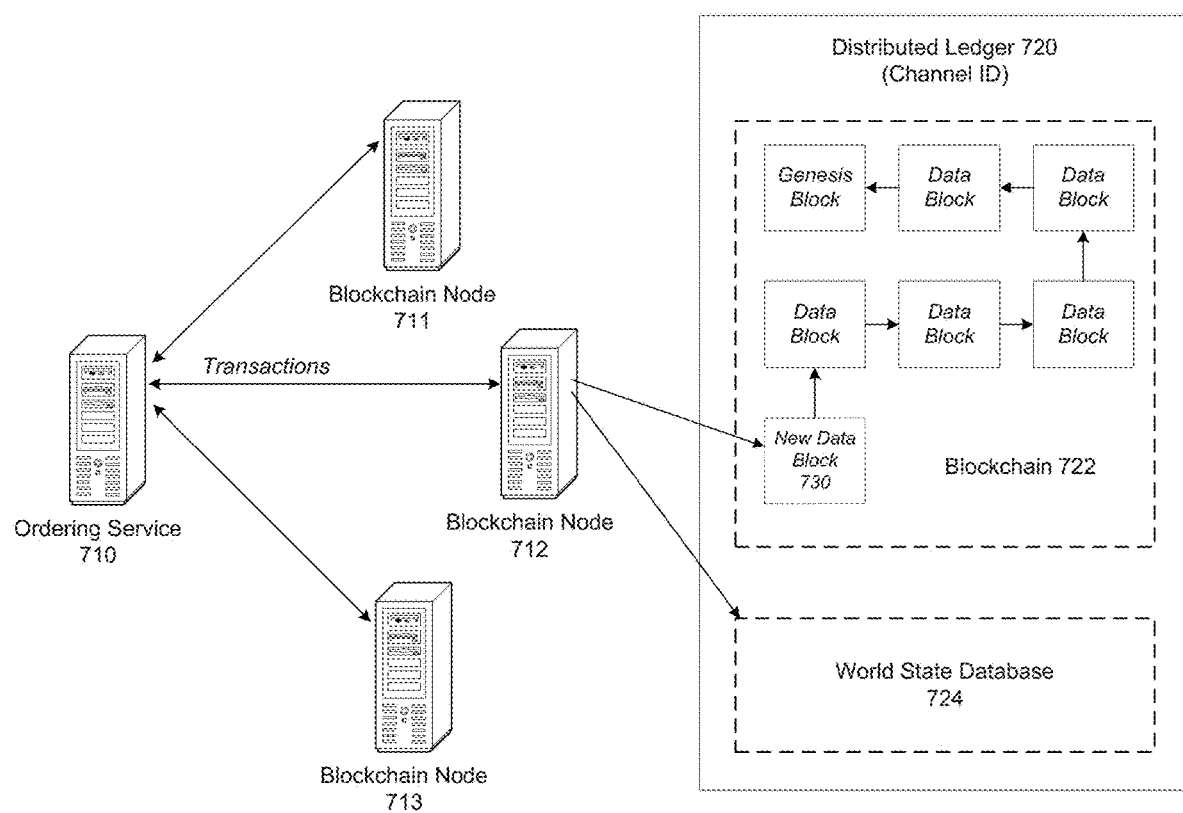
FIG. 7A illustrates a process for a new block being added to a distributed ledger, according to example embodiments.

An example of a ledger is shown in FIG. 7A. For some implementations, one or more of the nodes may manage more than one channel. When this is the case, the one or more nodes may manage a different ledger (e.g., blockchain and state database) for each of the channel.

Consensus-Based Creation of Index while Handling Privacy

Figure 5A:
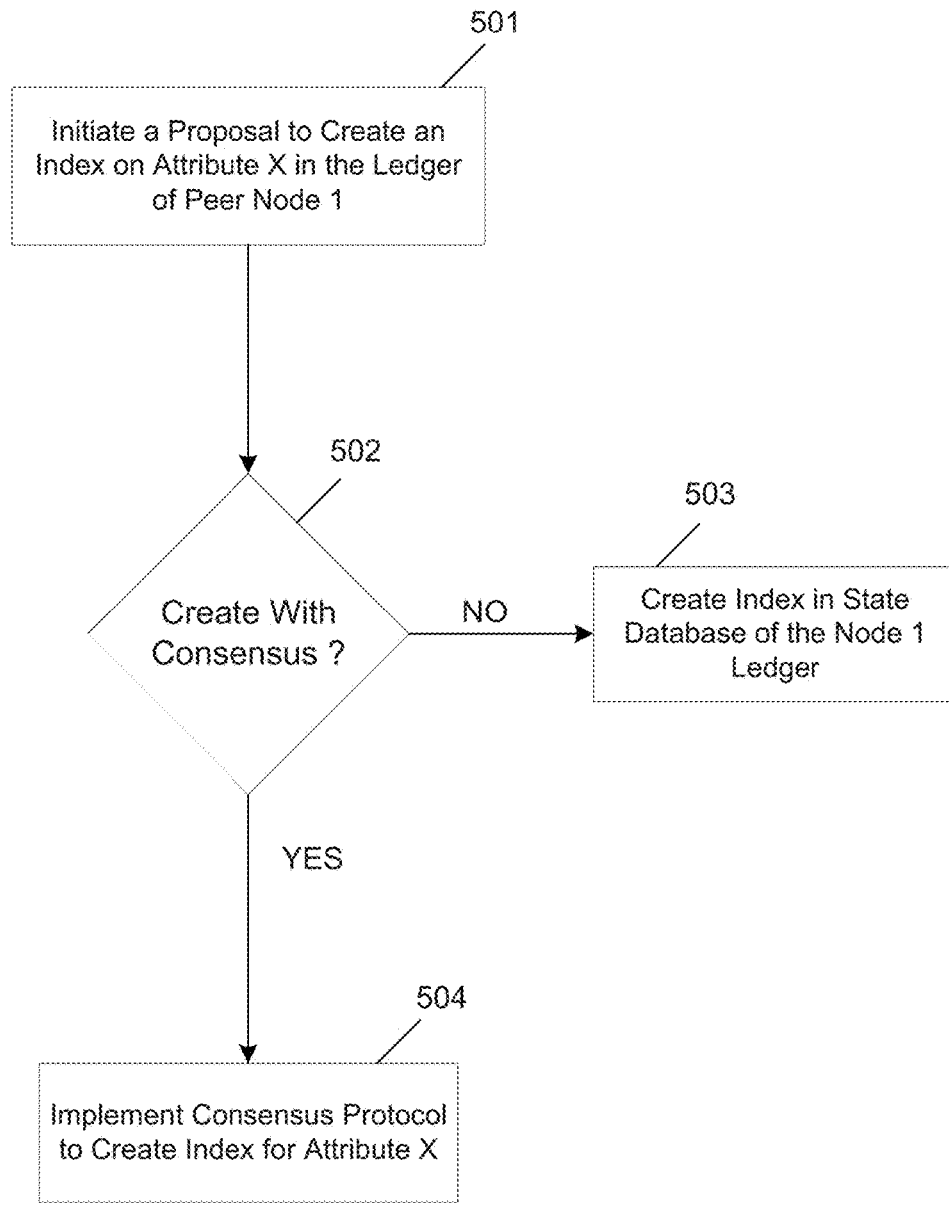
FIGS. 5A-5H illustrate flow diagrams according to example embodiments.

FIG. 5A illustrates an example method 500 to perform consensus-based creation of an index while handling privacy. This method 500 may apply in the case where one or more peer nodes are to create or update the index in the state database of its corresponding ledger. In the examples described below, Peer Nodes 1, 2, and 3 may correspond to the nodes in FIGS. 1A-1C and 4 or may applied in a blockchain network having a different configuration. Creation of an index may include creating a new index or updating an existing index. Examples include creating a new index when a corresponding peer node is added to the network or is to be reconfigured, creating new section of an index (e.g., adding one or more new state nodes correlated to other state nodes already in the index), linking one or more new state nodes in the index to one or more other state nodes, or generating new links to state nodes already in the index. The method embodiments described herein may be performed by the system and messaging embodiments previously described or may be performed by a different system or messaging.

At 501, a smart contract of Node 1 initiates the creation of an index for an attribute (X) in the state database of its ledger. Creation of the index for attribute X may be initiated, for example, based on a query (or history of queries) from one or more client applications. In one case, when the same or similar queries are received (e.g., ones including some common information such as, "show me all money transfers involving Joe Smith"), a smart contract of Node 1 (or other software managing the state database) may determine that an index should be created for a new attribute X corresponding to the query or queries. The smart contract may automatically make this decision, for example, based on policy information. In one embodiment, adding a new block to the blockchain may initiate creation of the index for an attribute associated with a transaction in the new block. In one embodiment, the Node 1 may receive a command from a client application, a user, or other network entity to create the index.

Attribute X may correspond, for example, a blockchain transaction or entry, information in a blockchain transaction or entry, a message, event, key information, or any other data or information pertaining to the clients, nodes, transactions, procedures, protocols, and/or other features of the blockchain network. Attribute X may be associated with one or more values, which, when included in the state database or otherwise related to attribute X, may allow query processing to be performed more quickly and efficiently.

For example, consider the case where attribute X corresponds to a transaction that involves the transfer of money between two parties. The attribute values associated with attribute X may be the names of the transacting parties, the amount of the money transfer and/or other assets or asset owners involved in the transaction, the type of money transfer (e.g., cash, bank, etc.), the financial institution involved in the money transfer if not by cash, key information and their current versions, and/or other information. In other embodiments, attribute X may have nothing to do with a transaction but rather may correspond to any other type of information or data pertinent to the blockchain, its applications, its users, and its intended use. The different attribute values may be stored in association with attribute X in the ledger, and may be referenced and used to process future queries that involve this attribute and its values. Initiation of the creation of an index for attribute X may be expressed as: create-index('1', 'x', attribute value(s) of the index).

At 502, once the decision has been made to initiate creation of the index for attribute X, the smart contract of Node 1 determines how the index will be created. This operation involves determining whether one of two options will be performed. The first option is to update the index based on attribute X without performing a consensus protocol relative to other nodes in the blockchain network. The second option is to update the index only after a consensus protocol is performed relative to other nodes in the blockchain network. The decision on how to update or create the index may be determined, for example, based on a privacy policy programmed into or otherwise accessible by the chaincode of the smart contract of Node 1.

At 503, when the privacy policy does not allow other peer nodes to be informed of the creation of an index for attribute X, then the smart contract implements the first option by creating the index for attribute X only in the ledger of Node 1, in accordance with the provisions of the privacy policy. In this case, the state database in the ledger of Node 1 will be different from the indexes in the ledgers of other peer nodes with respect to attribute X. The smart contract, therefore, safeguards the privacy of the index of Node 1 relating to attribute X when the answer to decision block 502 is no.

In one embodiment, each asset protected by the blockchain may include its own index in the state database. The index for attribute X may be created in a number of ways. In one embodiment, an index for attribute X may be created based on the following information: fields, name, and type. The fields may correspond to frequently queried fields or fields that are expected to be frequently queried. The name corresponds to the name of the index, e.g., attribute X. The type may correspond, for example, to JSON or another language used to create and query the index for attribute X. In one embodiment, the index for attribute X may be created based on a design document, e.g., a CouchDB construct which is designed to contain indexes, one for each attribute.

In one embodiment, multiple indexes may be created for attribute X. For example, one approach involves creating an index for only attribute X. Another approach involves creating an index multiple attributes, one of which is attribute X. The index may be automatically created by the chaincode when deployed or at another time as determined by the chaincode and/or its policy. Once created, the index for attribute X may be subject to index warming, which may involve, for example, requesting an update to the index after every block of data is committed to the blockchain.

Once the index is defined, it may be incorporated into the chaincode for deployment, for example, by placing it in an appropriate metadata folder. If the chaincode installation and instantiation uses Hyperledger Fabric Node SDK, the JSON index files may be located in any folder as long as it conforms to an associated directory structure. During chaincode installation (e.g., using client.installChaincode( )API) the attribute metadataPath may be included in an installation request. The value of the metadataPath is a string representing the absolute path to the directly structure containing the JSON index files, including the one for attribute X. In another embodiment, peer commands may be used to install and instantiate the chaincode. In this case, the JSON index files may be located under an appropriate metadata path.

Once the new (or updated) index for attribute X has been created and deployed, a verification operation may be performed to confirm that the index was successfully created, for example, by examining the peer log in the Docker container.

At 504, when the privacy policy allows other peer nodes to be informed of the index for attribute X, then the smart contract of Node 1 implements a consensus protocol for purposes creating the index for this attribute.

Figure 5B:
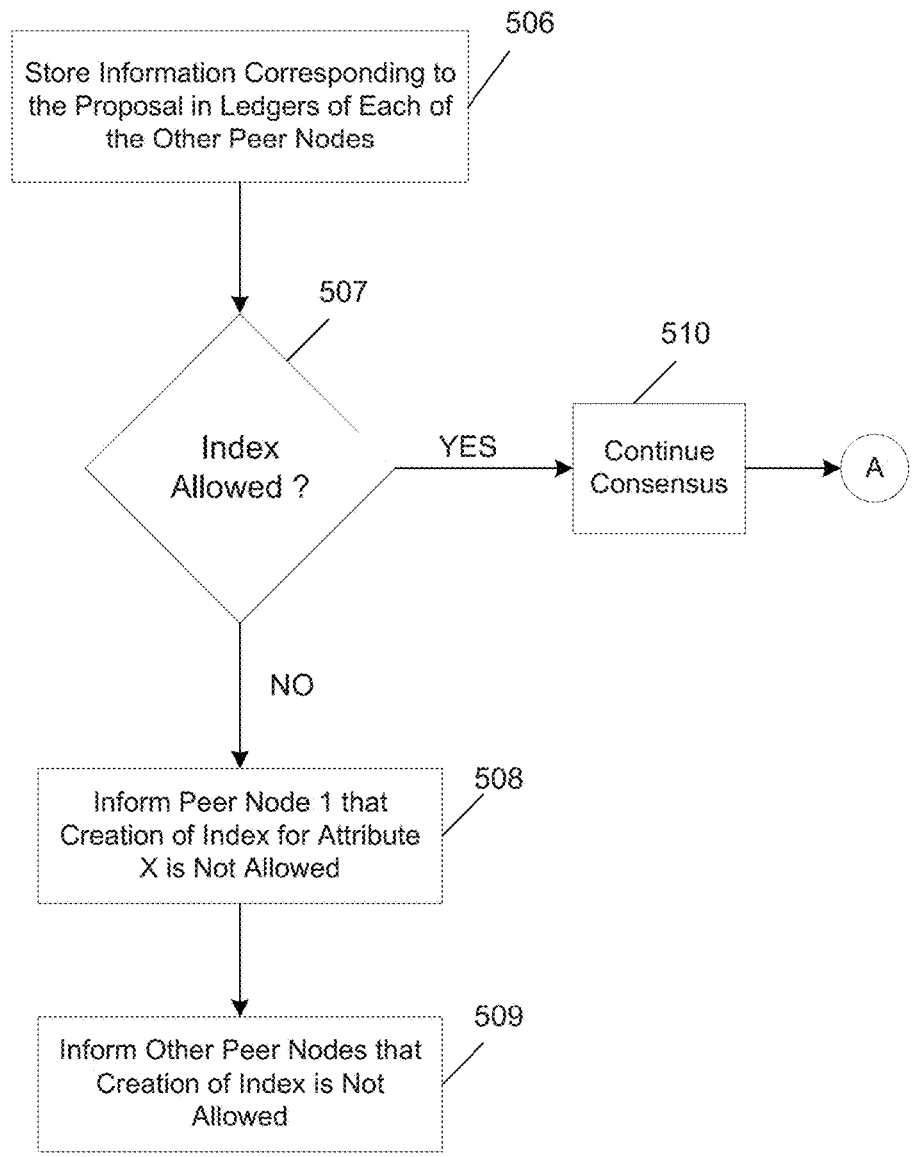

FIG. 5B shows an embodiment of a method for implementing a consensus protocol 505 for creating an index for attribute X among one or more of the nodes in the blockchain network.

The smart contract of Node 1 informs other peer nodes in the blockchain network of the proposal to create an index for attribute X. The other peer nodes (e.g., Node 2 and Node 3 in FIG. 1A) may be informed using a message or event sent, for example, through peer-to-peer communications through the network. In one embodiment, the smart contract of Node 1 may send a transaction including the proposal to an ordering service node, and the ordering service node may send a block containing the proposal to the other peer nodes in the network.

At 506, each of the other peer nodes may store information corresponding to the proposal received from Node 1 in their respective ledgers. The information may be stored as a transaction in an appended block, may be stored in a storage area of the state database or other area of the ledger, or in a storage area coupled to the ledger. In one embodiment, a registry may be used to store this information. One example of a registry is a historian registry of a Hyperledger Composer.

At 507, a smart contract in each of the other peer nodes determines if an index for attribute X is allowed to be created. This operation may be performed, for example, by the smart contract accessing policy information programmed into or otherwise accessible by the chaincode.

At 508, when the index for attribute X is not allowed to be created in one or more of the nodes, then the smart contract of those nodes inform Node 1 that creation of an index for attribute X is not allowed in those nodes. Node 1 may then store this information in its ledger, e.g., in a block appended to its blockchain indicating that the proposed action of creating an index for attribute X is invalid for the identified nodes or in a storage area of its state database, a registry (e.g., historian registry), or an off-chain storage area.

At 509, this same information may be sent to the other peer nodes in the blockchain network. Each node which is not allowed to create the index for attribute X may inform Node 1 and the other peer nodes, for example, through peer-to-peer connections to those nodes or through the ordering service node.

At 510, when the other nodes determine that creation of an index for attribute X is allowed for their respective nodes, then the consensus protocol continues.

Figure 5C:
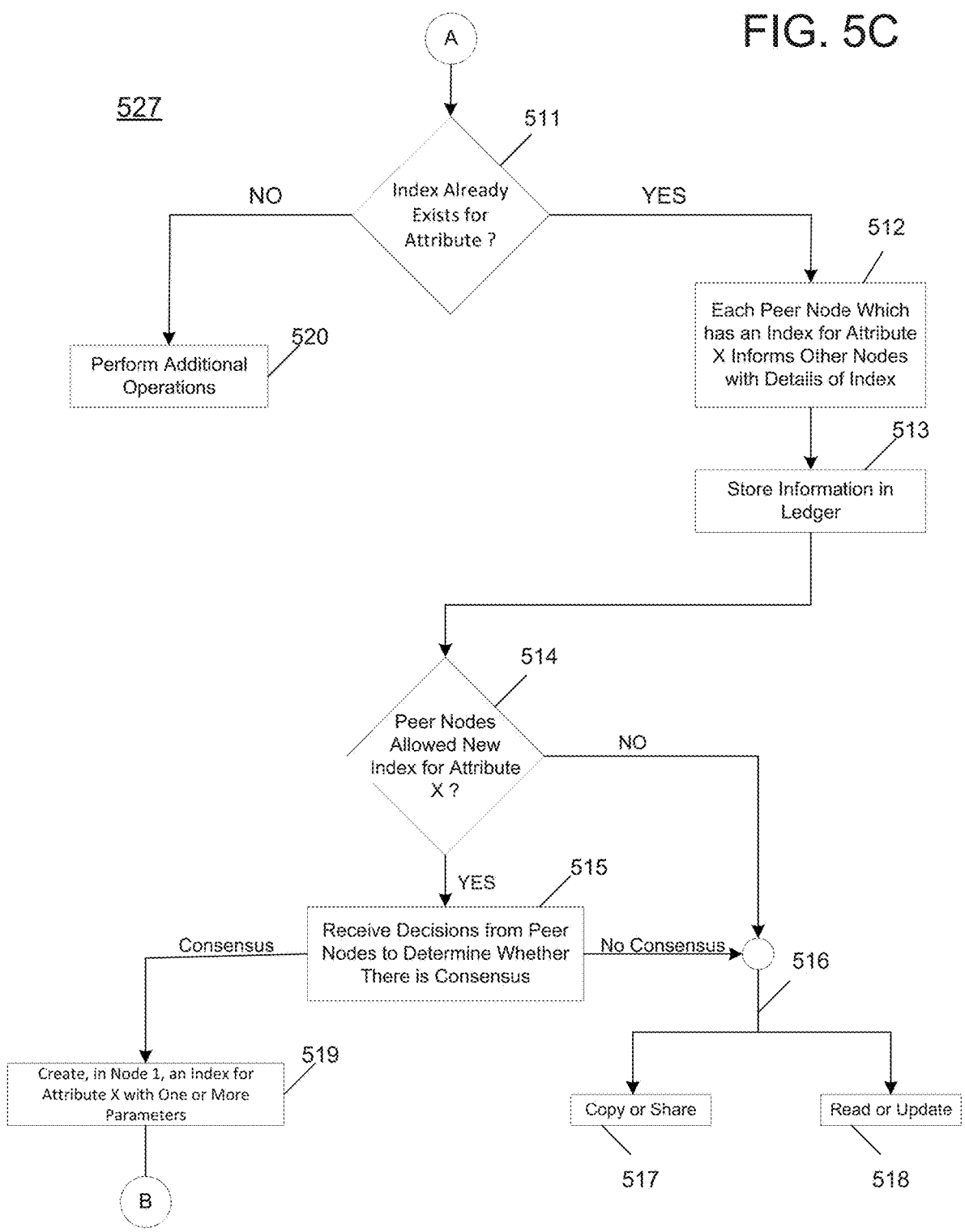

FIG. 5C shows additional operations 527 that may be performed in accordance with one embodiment of method when the consensus protocol continues from block 580 in FIG. 5B.

At 511, each peer node that is not Node 1 determines whether it already has an index on attribute X in the state database of its ledger. For example, Node 2 determines whether the state database of its ledger already has an attribute X. Node 3 and the other peer nodes in the network perform the same operation. This determination may be made, for example, by the smart contract of each node querying (or otherwise searching through) the information in the state database of their ledgers. In one embodiment, this information may include attributes that are indexed (e.g., correspond to state nodes) with associated values.

In one embodiment, the state database of each node may include a CouchDB database, and the queries may be performed using a GET command for a REST API using a Hyperledger Composer. The GET command may be automatically generated by the chaincode of the node in response to the proposal to create an index for attribute X. For example, the GET command may conceptually query the state database to "show all transactions in the blockchain that include attribute X." If no results are returned, then the smart contract for that node concludes that an index for attribute X is not included in its ledger. If results are returned, then the smart contract for that node concludes that an index for attribute X exists in the state database of its ledger. The query may be stored, along with other queries, in the ledger for historical purposes or for later use. For example, a historian registry of the Hyperledger Composer may store the queries and/or the query results, as well as transactions relating to the blockchain. When the Hyperledger Composer is used by a node, the Hyperledger Composer may add, remove or update assets, add, remove or update participants of transactions, issue, bind, activate and revoke identities, and/or perform other operations in association with the ledger.

At 512, when a peer node (e.g., peer Node N2) determines that its ledger already includes an index on attribute X, then the smart contract of the peer node broadcasts information indicating that this peer node (N2) has an index for attribute X. This information is broadcast to Node 1 and the other peer nodes in the network, along with details about the index. These details may include, for example, the values of attribute X stored in the state database of the broadcasting peer node (N2). As previously indicated, these values may be, for example, the type the attribute, assets associated with the attribute, asset owners of the attribute, and/or any other information that may be useful in answering queries performed based on the index of this attribute. Other peer nodes may broadcast similar information if they too store an index for attribute X in their ledgers.

At 513, each peer node which broadcasted the information in block 512 may store the fact that the information was broadcast to the other peer nodes in its ledger. Peer nodes which receive this information concerning attribute X may also store the information in their ledgers. The attribute values for the other peer nodes may also be stored in this location.

At 514, a consensus protocol is initiated to determine whether Node 1 is permitted to create an index for attribute X. In implementing the consensus protocol, all peer nodes that already have an index for attribute X (e.g., Nodes 2 and 3) run their smart contracts to determine whether a new index is allowed to be created for attribute X in one or more other peer nodes, e.g., in this case Node 1. The smart contract of each peer node may make this determination, for example, based on one or more policies stored in or otherwise accessible by the chaincode of its smart contract. These policies may ensure privacy across the network, when it comes to the creation of a new index for attribute X in the peer nodes.

At 515, the peer nodes involved in the consensus protocol broadcast their decisions to allow creation of a new index for attribute X to a consensus manager. The consensus manager may take one of several forms. For example, the consensus manager may be implemented by chaincode of the smart contract controlling Node 1, which seeks to create an index for attribute X in its ledger. In this case, the smart contract of Node 1 receives the decisions by the other peer nodes as to whether to allow Node 1 to create an index for attribute X for its ledger. The smart contact of Node 1 will compare these decisions and then proceed based on these decisions.

In one embodiment, the consensus manager may include all of the peer nodes themselves, or the peer nodes that already have an index for attribute X in their ledgers. In this case, each peer node receives the decision from the other peer nodes (excepting Node 1) and then compares those decisions with its own decision using its smart contract logic. The smart contract then sends the results of its comparison to Node 1, which then proceeds based on these decisions.

In one embodiment, the consensus manager may include chaincode of a designated one of the peer nodes (e.g., Node 2 or Node 3), which serves as a leader node to compare the decisions from itself and the other peer nodes and then sends the results of the decisions or a decision on consensus to Node 1.

At 516, when there is no consensus (e.g., one or more of the peer nodes do not allow creation of a new index for attribute X in another node, such as Node 1), then one of two options may be taken by Node 1 in accordance with the consensus protocol. The option taken may itself be determined by consensus with the other nodes. For example, the other nodes may transmit with their decisions an indication of how Node 1 may be allowed to access an index for attribute X. The smart contract for Node 1 may then proceed. In one embodiment, the smart contract of Node 1 may determine the option.

The first option, at 517, is copy or share. For example, Node 1 may receive a copy of the index structure of attribute X from another one of the peer nodes. The other node may be selected randomly, based on one or more predetermined criteria, or based on its chaincode. The copy of the index structure of attribute X may be received along a peer-to-peer connection with another node (e.g., Node 2 or Node 3), for example, in response to a request transmitted by Node 1.

In one embodiment, Node 1 may be allowed to share the index structure of attribute X from another peer node, for example, by accessing the node structure from another node (e.g., Node 2 or Node 3) but not updating its state database to include the index structure. Because the blockchain in the ledger of each node is the same (e.g., for core features of the blockchain), the shared node structure of attribute X may be used, for example, to answer relevant queries from a client application. The option selected is added to the ledger to keep a record of how Node 1 is to proceed relative to accessing and using an index for attribute X.

The second option, at 518, is read or update. For example, Node 1 is allowed to read or use the index of attribute X. In one embodiment, Node 1 may be allowed to update the index of attribute X. The option selected is added to the ledger to keep a record of how Node 1 is to proceed relative to accessing and using an index for attribute X.

At 519, if there is consensus (e.g., all of the peer nodes allow creation of a new index for attribute X in another node, such as Node 1), then the smart contract logic (e.g., chaincode) of Node 1 creates an index for attribute X, for example, in accordance with the operations discussed relative to Block 503 in FIG. 5A. The index may be created in accordance with one or more parameters. These parameters may include, for example, a certain height, a certain breadth, a certain fan-out, a certain sharing parameter (e.g., sharing allowed/sharing not allowed), and/or other parameters for the index. While the index for attribute X may be created at this time, the index may not yet be recorded in the state database in the ledger of Node 1. One or more additional operations may be performed before the index may be written to the state database.

At 520, If the index already exists for attribute X in Block 511, then other operations in in effort to obtain consensus may be performed, for example, as indicated in Blocks 523, 524, and 525, or operations included in one or more of FIGS. 5E to 5H. In one embodiment, there may be no participation in consensus or one or more operations described below may be performed to share, copy, read, update, or perform another operation for attribute X.

Figure 5D:
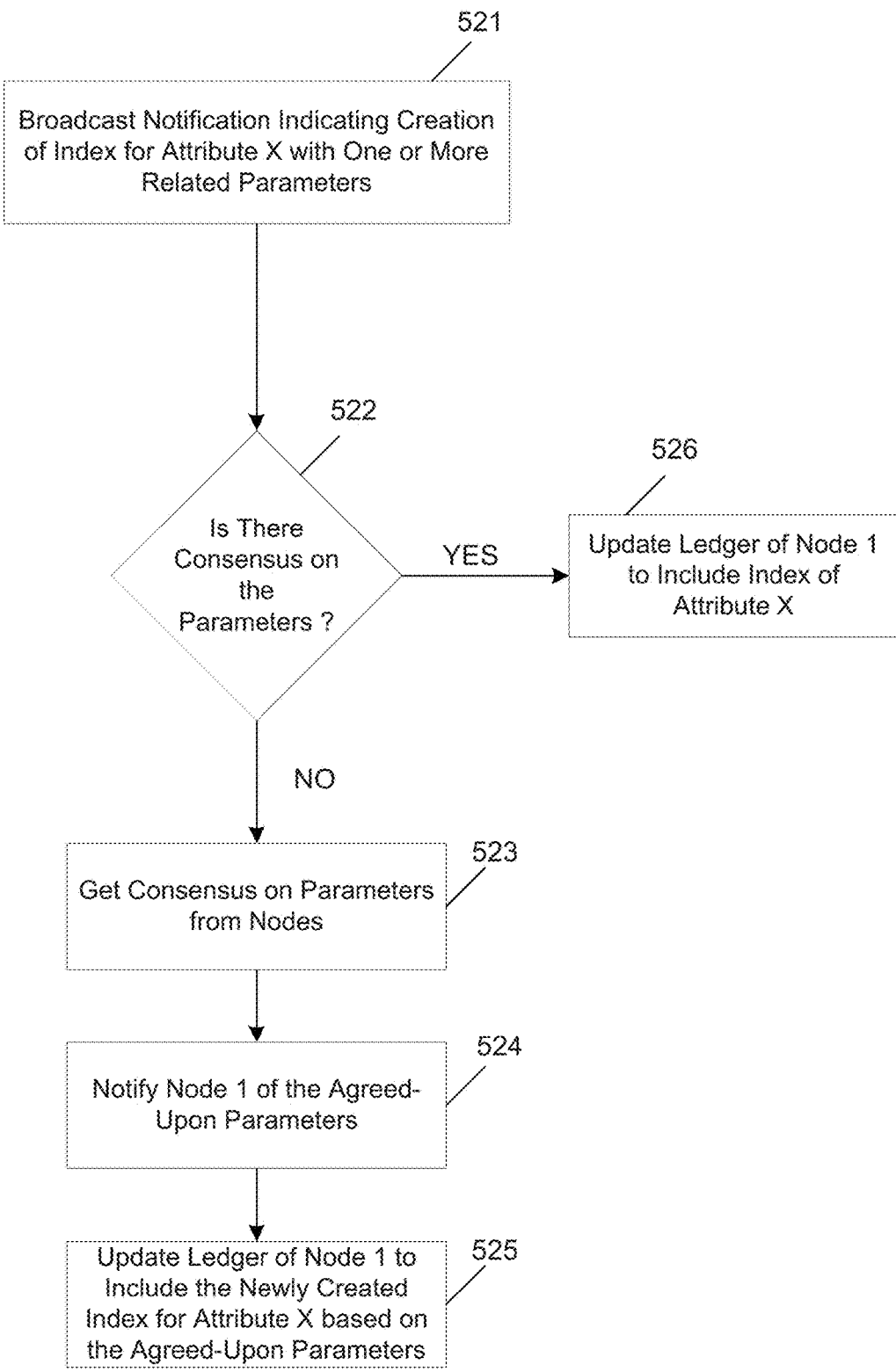

FIG. 5D shows an embodiment of additional operations 528 that may be performed when an index is created by Node 1 after consensus. The operations may be considered to be included in an additional consensus protocol, or an extension of the previous consensus protocol.

At 521, the smart contract of Node 1 may broadcast a notification indicating that an index for attribute X has been created in the ledger of Node 1. The notification may include information indicating the parameters for the index, as discussed with respect to Block 519 in FIG. 5C. The notification may be broadcast to the consensus manager as previously indicated. For example, the consensus manager may be implemented by chaincode of the smart contract controlling Node 1, which receives decisions on the parameters from other peer nodes in response to the notification.

In one embodiment, the consensus manager may include logic in all of the peer nodes (or the peer nodes that already have an index for attribute X in their ledgers), each of which receives decisions from the other peer nodes (excepting Node 1) on the parameters and then compares those decisions with its own decision using its smart contract logic. The smart contract then sends the results of its comparison to Node 1, which then proceeds based on these decisions.

In one embodiment, the consensus manager may include chaincode of a designated one of the peer nodes, which serves as a leader node to compare the decisions on the parameters from itself and the other peer nodes and then sends a decision on consensus to Node 1.

At 522, a determination is made as to whether there is consensus on the parameters of attribute X based on the decisions from the peer nodes. Consensus may be obtained, for example, if all the decisions from all the peer nodes agree on the parameters of the index for attribute X created in Node 1, or if a predetermined number of nodes agree on these parameters.

At 523, if there is no consensus (e.g., no agreement among the peer nodes as to the parameters) for the index and its associated parameters for attribute X created in Node 1, then the peer nodes are notified (e.g., by the consensus manager) and additional operations are performed to obtain consensus on the parameters. For example, the consensus manager may determine that the lowest value of the height and the lowest value of the breadth for the index of attribute X among all the nodes will be the breadth and height of the index in Node 1. In one embodiment, the consensus manager may determine that the most common values for the height and breadth of the index of attribute X, or an average of these values, among all the nodes will be the breadth and height of the index in Node 1. Similar operations may be performed for the sharing parameter, e.g., if all the nodes allow sharing of their indexes for attribute X, then Node 1 may be allowed to share its index for attribute X; otherwise not.

At 524, once there is agreement of all nodes as to the parameters for the index of attribute X created in Node 1, then the consensus manager notifies Node 1 of the agreed-upon parameters.

At 525, once notified, the chaincode of Node 1 will record the newly created index for attribute X in the state database of its ledger according to the agreed-upon parameters. The index of attribute X may then be used, for example, to respond to queries of the blockchain from one or more client applications.

At 526, when there is consensus as to the parameters in Block 522 (e.g., all the peer nodes agree on the parameters generated by the smart contract of Node 1 for the newly created index for attribute X), then the consensus manager notifies Node 1 and the chaincode of Node 1 records the index for attribute X in the state database of its ledger based on the parameters.

Consensus-Based Update of Index with Privacy

Figure 5E:
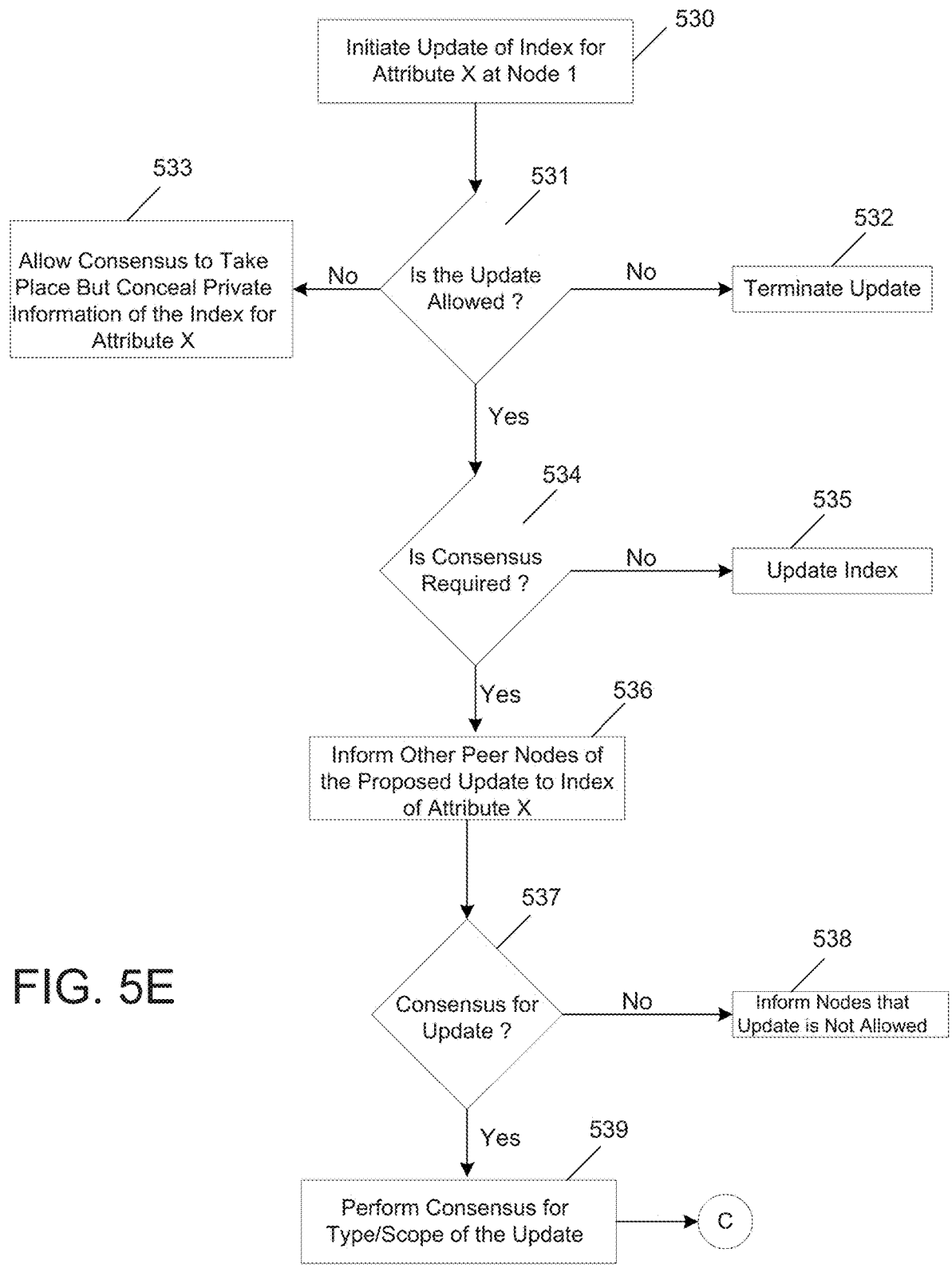

FIG. 5E shows an embodiment of a method of performing a consensus-based update 529 of an index with privacy, which index may have been created, for example, based on the operations in one or more of FIGS. 5A-5D. The method of FIG. 5E may be performed, for example, when changes or other updates are to be performed for the index, which, in this case, may be the index for attribute X.

At 530, a smart contract of Node 1 initiates an update for the index of attribute X in the state database of its ledger. The initiation may be performed automatically or based on a command as previously described, for example, with respect to Block 501 of FIG. 5A. The update may be initiated, for example, to include a new or changed value for attribute X, to change a parameter of the index, to include additional information in the index for attribute X, or to make another type of change for this index. This changed may be prompted, for example, by recent or historical queries that would allow future queries to be more efficiently performed if the index of attribute X were updated based on the historical queries.

At 531, an initial determination is made as to whether the index of attribute X in Node 1 can be updated. This may be performed, for example, with reference to a privacy policy.

In one embodiment, the privacy policy may dictate that the privacy of the index is to be protected in terms of the number of updates that have been or are allowed to be performed to the index and/or the type of updates that have been or now is sought to be performed.

At 532, when the proposed update would exceed a certain number of updates or the type of update is otherwise impermissible in view of the prevailing privacy policy, then one operation involves terminating the update.

At 533, as an alternative to termination, when certain features or information of the index (or proposed update to the index) are not permitted by privacy policy, the method may continue by keeping those features or information private. Other features or information relating to the index (or its update) may be permitted by the privacy policy to be provided to other peers during the subsequent consensus operations.

At 534, a decision is made as to whether the smart contract of Node 1 requires consensus to be performed in order to update the index of attribute X. This determination may be made, for example, based on one or more conditions programmed into the chaincode of the smart contract, based on a privacy policy or consensus protocol, or based on other information governing updates to indexes in the blockchain network. Such an update may be expressed, for example, as: Update-index ('A', 'x' current meta-values of the index parameters, new values for the index parameters to be changed), where the index parameters may be as previously described, e.g., height, breadth, fan-out, sharing parameter, etc.

At 535, if consensus is not required, then the smart contract of Node 1 may update the index of attribute X in the state database of its ledger without agreement from the other nodes. If consensus is required, then process flow continues with the following operations.

At 536, the smart contract of Node 1 informs all other peer nodes (or the peer nodes that have an index for attribute X) that an update to the index of attribute X is to be performed. The smart contract of Node 1 may add information to its ledger (e.g., a registry, block, etc.) indicating that the peer nodes have been informed.

At 537, the peer nodes (e.g., Node 2 and Node 3) that were informed make a decision as to whether the proposed update to the index of attribute X by Node 1 is allowed. This decision may be made by the smart contracts of these nodes, for example, based on privacy policies or other information relating to control over changes that are allowed to be made to the index. As previously described with respect to operations performed in one or more of FIGS. 5A-5D, each of the peer nodes render a decision and the consensus manager may determine and inform Node 1 whether the update is permitted.

At 538, if consensus is not obtained (e.g., if one or more of the other peer nodes indicates that the update to the index is not allowed), then the consensus manager may inform Node 1 and the other peer nodes that the update is not allowed.

At 539, if consensus is obtained, additional operations are performed to obtain consensus on the type and/or scope of the update.

Figure 5F:
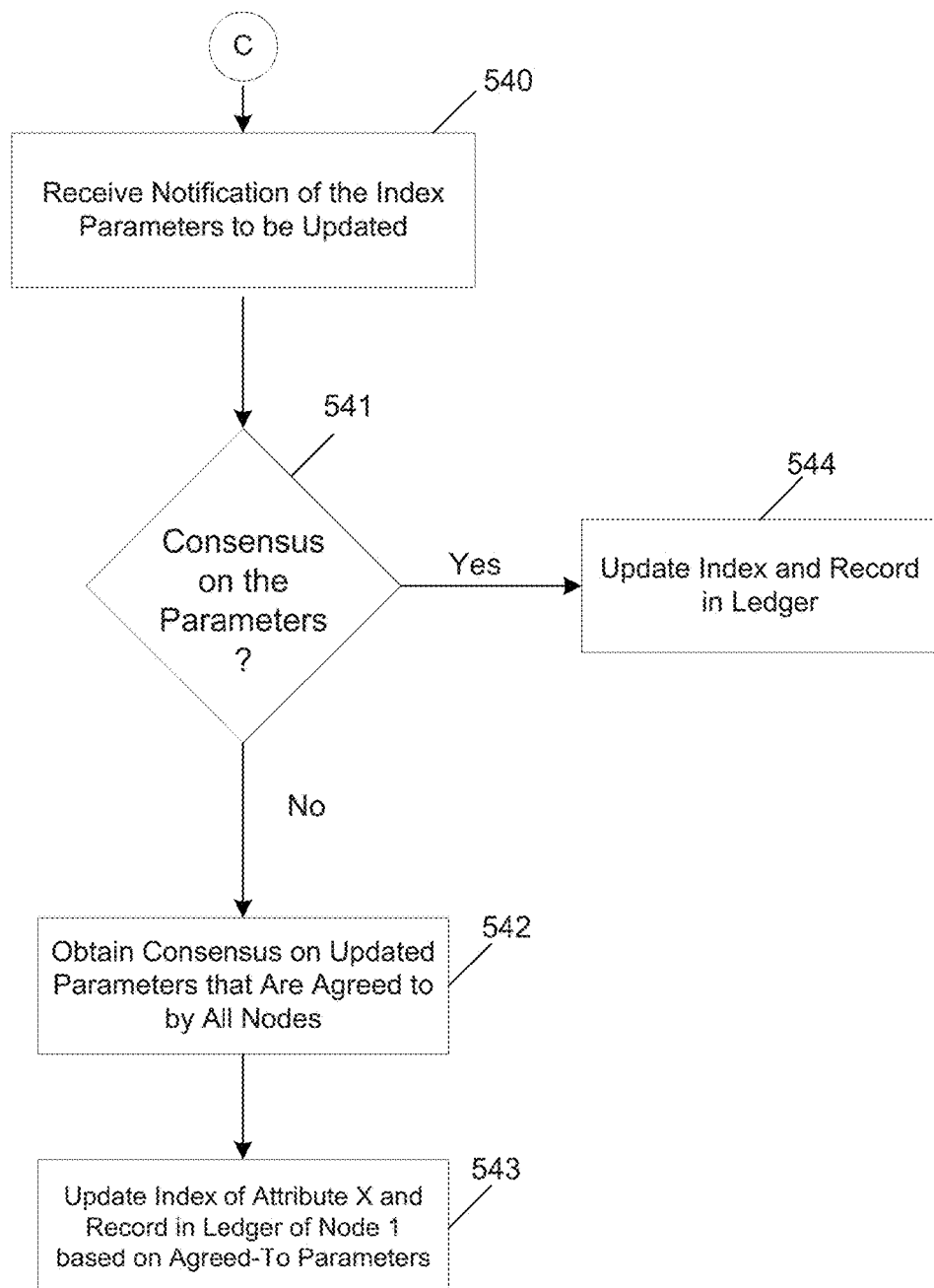

FIG. 5F shows an embodiment of the additional operations 544 that may be performed to obtain consensus on the type and/or scope of the update.

At 540, the smart contract at each peer node is notified of the parameters of the index that are to be updated (or otherwise changed or added). These parameters may be sent with information included in the initial notification of the update to the other peer nodes at Block 536, or may be received after that time, from Node 1. Prior to this operation, each of the peer nodes may determine whether it has an index on attribute X. If it does not, the peer node may take no more action in terms of the update to be made to the index to Node 1.

At 541, the nodes including the index to be updated participates in a consensus protocol for the parameters to be updated. The consensus protocol may be performed by the consensus manager (as previously described).

At 542, if there is no consensus (e.g., if one or more peer nodes do not agree to one or more of the parameters to be updated), a subsequent consensus protocol is performed by the consensus manager to obtain agreement from the peer nodes on parameters that can be used for the update. These parameters may be of the type previously described in connection with creation of the index, e.g., lowest parameter of the index among all peers, most commonly used parameter among all peers, an average, etc.

At 543, the other nodes (or the consensus manager) may inform Node 1 of the agreed-upon parameters and the update to the index of attribute X may be performed and written into the ledger of Node 1.

At 544, if consensus is obtained on the parameters generated by the smart contract of Node 1 for purposes of updating the index of attribute X, then Node 1 is informed by the consensus manager, the update is performed and recorded in the ledger of Node 1 based on the parameters.

Consensus-Based Sharing of Index with Privacy

Figure 5G:
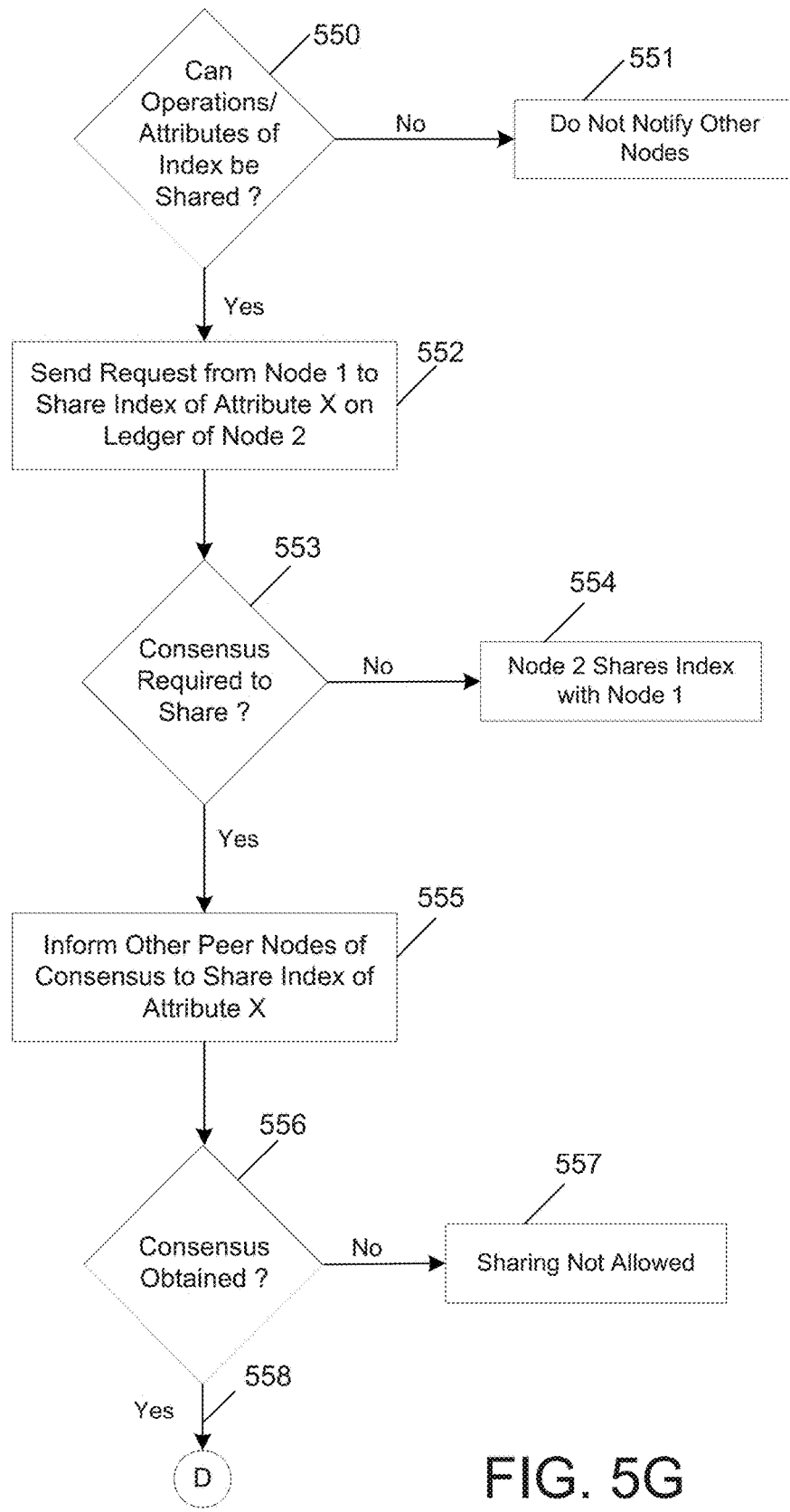

FIG. 5G shows an embodiment of a method of performing a consensus-based sharing 545 of an index among the peer nodes. This method may be performed with privacy, and may be performed, for example, in Block 517 of FIG. 5C or in other cases where the index of attribute X cannot be shared among nodes because of privacy policies.

At 550, a determination is made as to whether certain operations that are requested to be performed on the index of attribute X in Node 1, or whether certain attributes of the index themselves, are allowed to be shared with other nodes. This decision may be made, for example, based on one or more privacy policies written into the chaincode of or accessed by the smart contract of Node 1. At this point, it is noted that the privacy policies may be updated periodically or dynamically in order to change the privacy requirements relative to the index of attribute X (as well as the other indexes in the state database of the ledger). Changing or updating the privacy policies may, in turn, affect a change the decisions, ledger updates, and/or consensus protocols performed among the nodes in relation to managing the indexes in the ledgers of the peer nodes.

At 551, if the operations or attributes are not allowed to be shared, the smart contract of Node 1 prevents Node 1 from notifying the other nodes of those operations or attributes.

At 552, if the operations or attributes are allowed to be shared, then one of the peer nodes (e.g., Node 1) may send a request to another peer node (e.g., Node 2) to share the index on attribute X on the ledger of that peer node (Node 2). This request may be sent, directly or indirectly, along one or more peer-to-peer connections between Nodes 1 and 2, for example, based on a command from a client application of Node 1 or automatically generated by the smart contract of Node 1 in response to a query or other action. The share request may be expressed as: Share-index ('2', 'x', 'Z'), where Z is one or more of read-only share, update-share, or share part of the index.

At 553, the smart contract of Node 2 determines whether consensus is required in order to allow sharing of the index for attribute X. The smart contract of Node 2 may make this decision based on policy information stored in its node.

At 554, if consensus is not required, then Node 2 shares its index for attribute X with Node 1, for example, by sending information corresponding to this index through a peer-to-peer connection or otherwise by allowing Node 1 access to the index whenever Node 1 is to use it, for example, to respond to a query.

At 555, if consensus is required, the smart contract of Node 2 informs all other peers of this information, e.g., that consensus is required for allowing Node 2 to share its index for attribute X with Node 1. The chaincode of Node 2 may add information to its ledger indicating that such a notification was made for consensus. The other nodes may also add information to their ledgers indicating that they have been requested to perform a consensus protocol for purposes of sharing the index. In one embodiment, the consensus manager may inform and/or interact with the peers to obtain consensus for sharing the index of attribute X.

At 556, a determination is made as to whether consensus is obtained from the peer nodes as to whether Node 2 is allowed to share its index for attribute X with Node 1. In one embodiment, the smart contract of each peer node may check a privacy policy or other management information to make this determination. Then, a consensus manager (e.g., as previously discussed) may determine whether there is consensus regarding sharing the index of attribute X.

At 557, if consensus is not obtained, Node 1 is informed that index sharing is not allowed and the other peers are also informed of this information.

At 558, if there is consensus, additional operations are performed as indicated below.

Figure 5H:
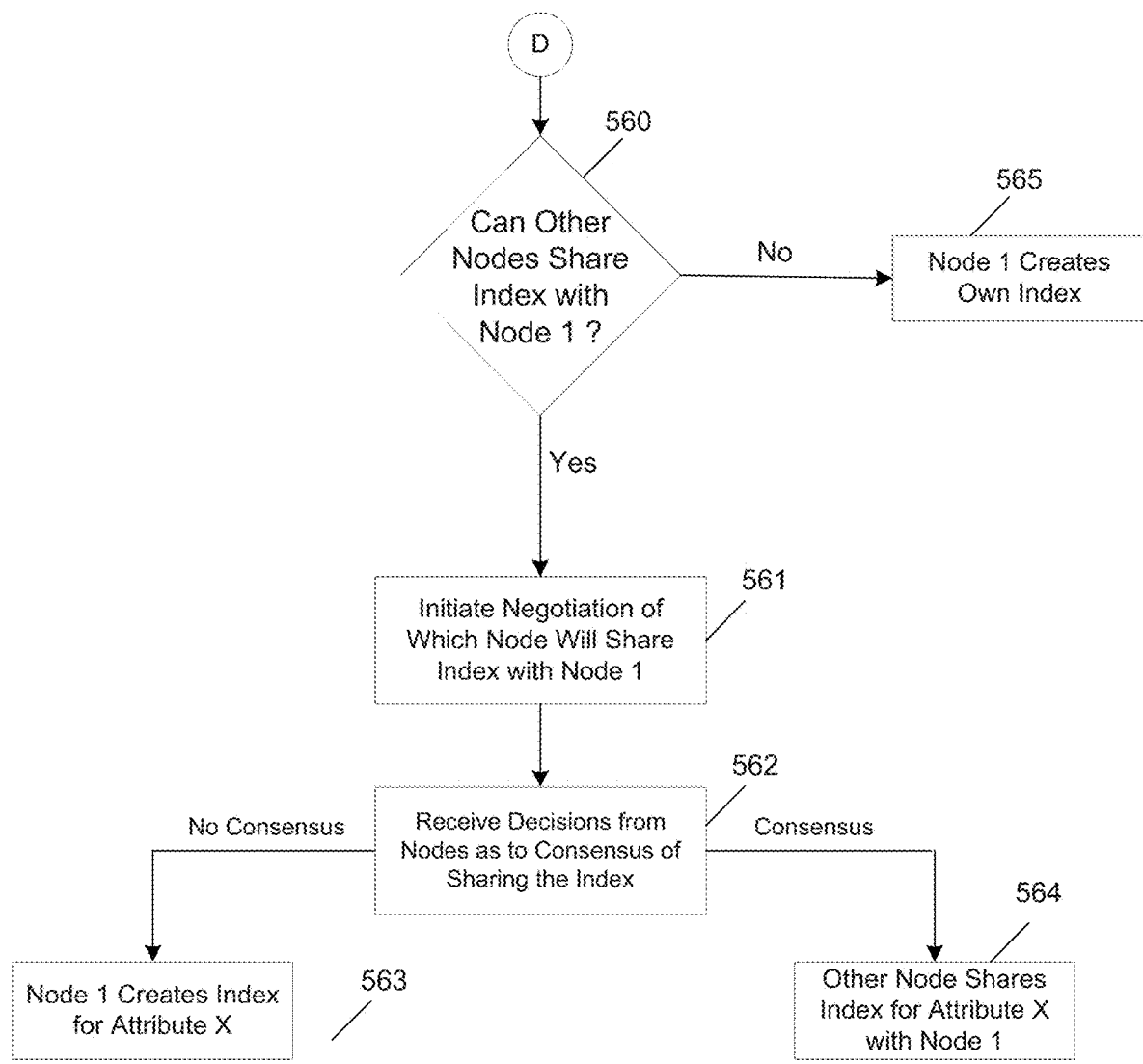

FIG. 5H shows additional operations 559 that may be performed when there is consensus to allow sharing of the index of attribute X, according to one or more embodiments.

At 560, the smart contracts of other peer nodes (not Node 1 or Node 2) determine whether those nodes have an index on attribute X and whether those nodes are allowed to share their indexes for attribute X with Node 1.

At 561, for each node (e.g., Node C) in operation 560 that has an index for attribute X that can be shared, a negotiation may be performed by the consensus manager as to whether Node 2 should share its index of attribute X with Node 1 or whether Node C should share its index of attribute X with Node 1. The negotiation may involve the consensus manager performing a consensus protocol with the peer nodes as to which node should share its index with Node 1.

At 562, each node subject to the consensus protocol may return a decision indicating which node should share its index with Node 1. This decision may be made, for example, based on various types of information, including but not limited to node ownership, client application ownership, user information, one or more predetermined preferences programmed into the chaincode of the nodes, a network or node policy that favors one node over another, and/or based on other information. The decision of each node may be returned to the consensus manager, which may be one or more entities as previously described herein.

At 563, if there is no consensus as to which node should share the index, the consensus manager may instruct Node 1 to create its own index for attribute X in accordance with the creation embodiments previously discussed based on the agreed-upon parameters (e.g., see operations 524 and 525).

At 564, if there is consensus, then the node that obtained the consensus may share its index with Node 1 in accordance with operations of their respective smart contracts. The consensus manager or chaincode of Node 1 may control this operation. Additionally, or alternatively, the index shared with Node 1 may be based on new parameters set by consensus or chaincode. Node 1 may then record sharing of the index for attribute X in its ledger.

At 565, if other nodes are not allowed to share their indexes for attribute X with Node 1, then Node 1 may be notified (e.g., by the other nodes and/or consensus manager) and may create its own index for attribute X based on one or more parameters agreed-upon by other nodes or programmed into its chaincode.

Figure 6A:
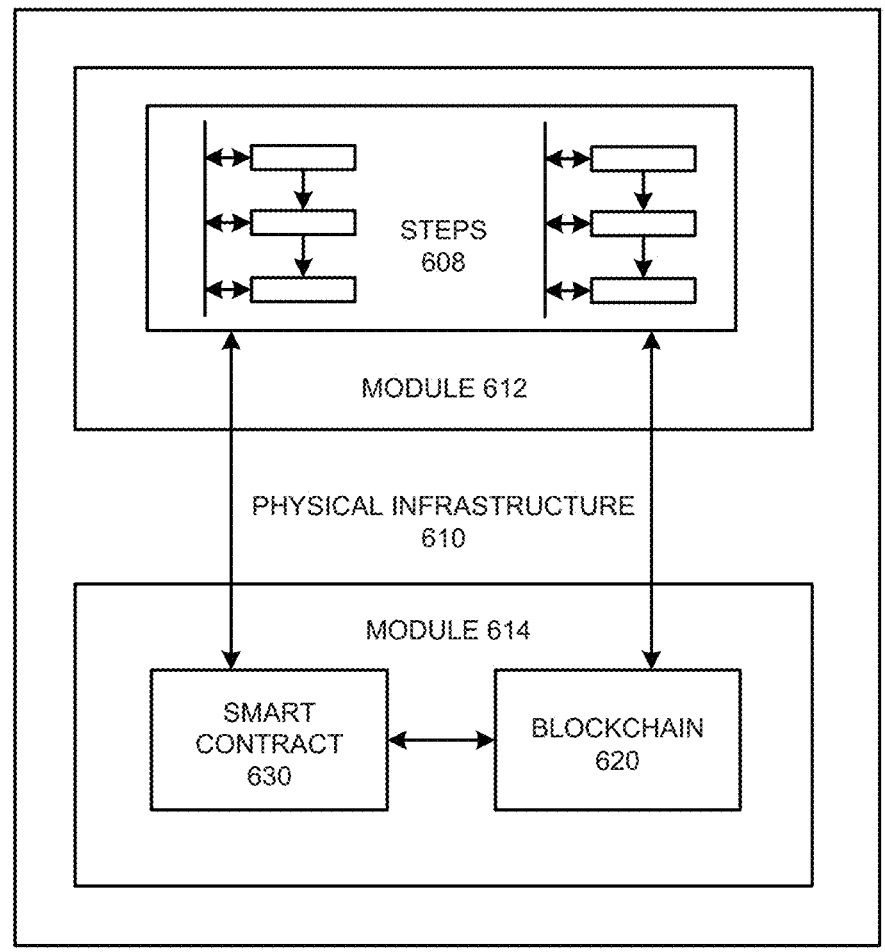
FIG. 6A illustrates an example system configured to perform one or more operations described herein, according to example embodiments.

FIG. 6A illustrates an example system 600 that includes a physical infrastructure 610 configured to perform various operations according to example embodiments. Referring to FIG. 6A, the physical infrastructure 610 includes a module 612 and a module 614. The module 614 includes a blockchain 620 and a smart contract 630 (which may reside on the blockchain 620), that may execute any of the operational steps 608 (in module 612) included in any of the example embodiments. The steps/operations 608 may include one or more of the embodiments described or depicted and may represent output or written information that is written or read from one or more smart contracts 630 and/or blockchains 620. The physical infrastructure 610, the module 612, and the module 614 may include one or more computers, servers, processors, memories, and/or wireless communication devices. Further, the module 612 and the module 614 may be a same module.

Figure 6B:
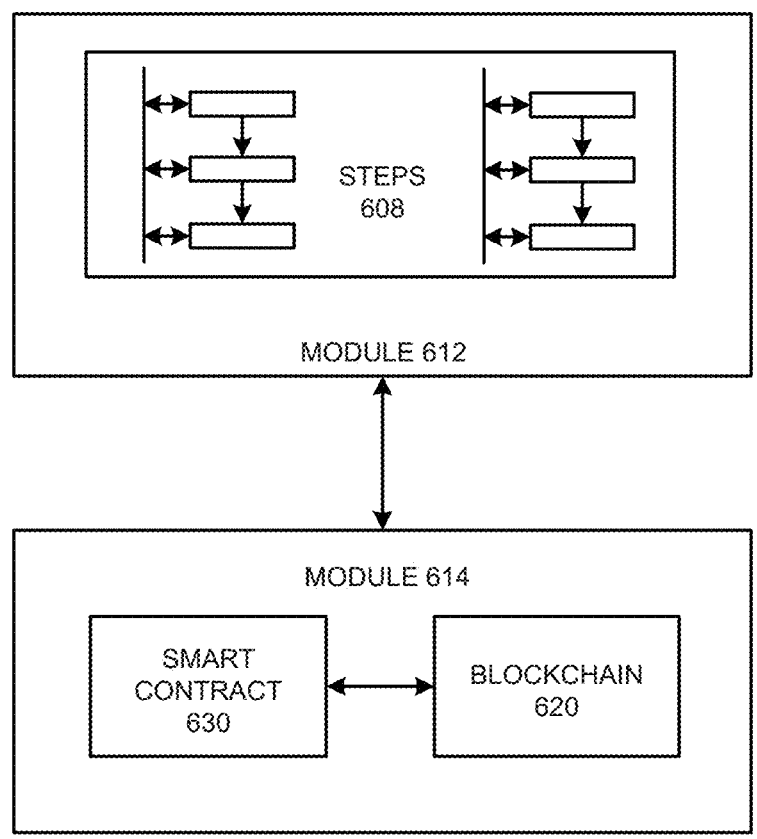
FIG. 6B illustrates another example system configured to perform one or more operations described herein, according to example embodiments.

FIG. 6B illustrates another example system 640 configured to perform various operations according to example embodiments. Referring to FIG. 6B, the system 640 includes a module 612 and a module 614. The module 614 includes a blockchain 620 and a smart contract 630 (which may reside on the blockchain 620), that may execute any of the operational steps 608 (in module 612) included in any of the example embodiments. The steps/operations 608 may include one or more of the embodiments described or depicted and may represent output or written information that is written or read from one or more smart contracts 630 and/or blockchains 620. The physical infrastructure 610, the module 612, and the module 614 may include one or more computers, servers, processors, memories, and/or wireless communication devices. Further, the module 612 and the module 614 may be a same module.

Figure 6C:
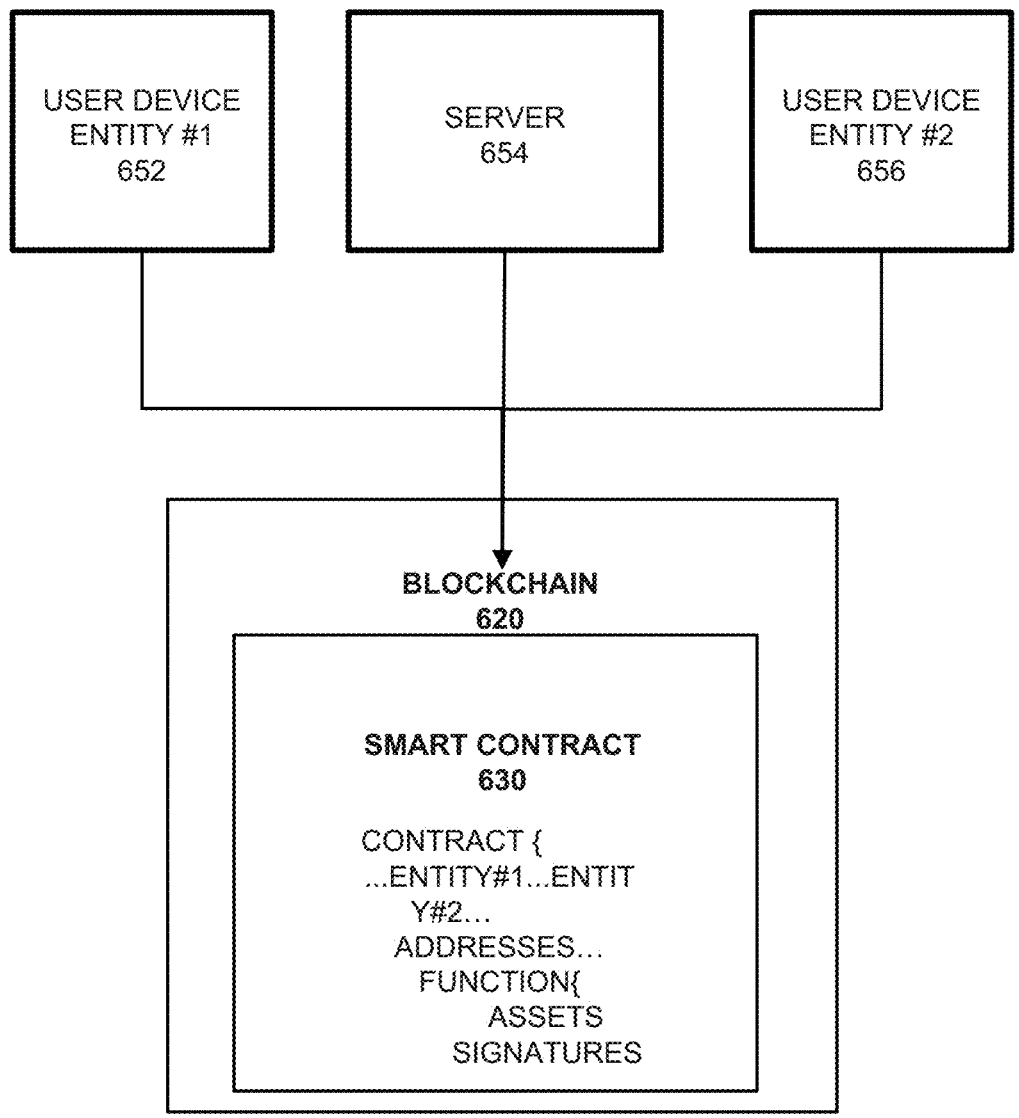
FIG. 6C illustrates a further example system configured to utilize a smart contract, according to example embodiments.

FIG. 6C illustrates an example system configured to utilize a smart contract configuration among contracting parties and a mediating server configured to enforce the smart contract terms on the blockchain according to example embodiments. Referring to FIG. 6C, the configuration 650 may represent a communication session, an asset transfer session or a process or procedure that is driven by a smart contract 630 which explicitly identifies one or more user devices 652 and/or 656. The execution, operations and results of the smart contract execution may be managed by a server 654. Content of the smart contract 630 may require digital signatures by one or more of the entities 652 and 656 which are parties to the smart contract transaction. The results of the smart contract execution may be written to a blockchain 620 as a blockchain transaction. The smart contract 630 resides on the blockchain 620 which may reside on one or more computers, servers, processors, memories, and/or wireless communication devices.

Figure 6D:
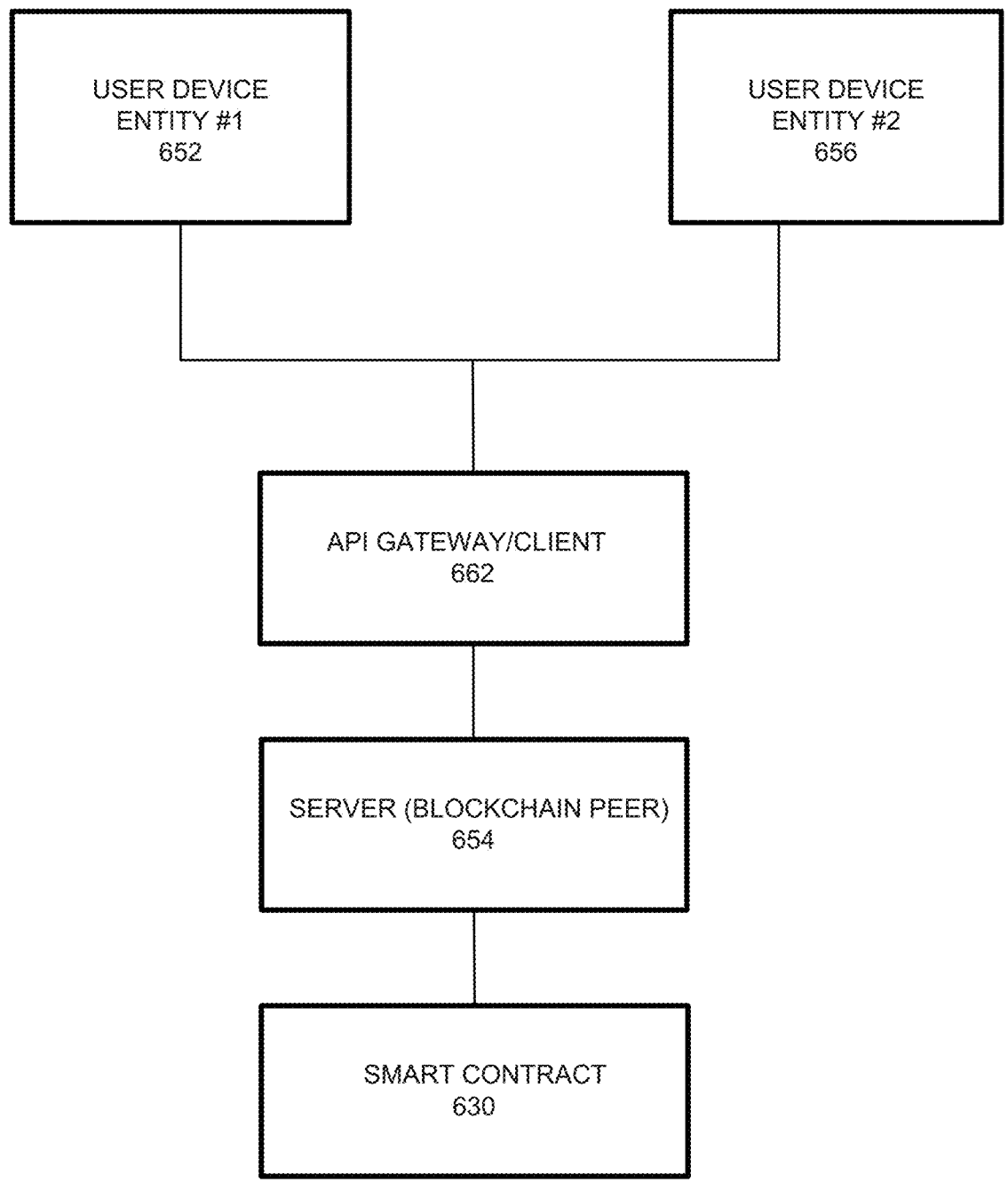
FIG. 6D illustrates yet another example system configured to utilize a blockchain, according to example embodiments.

FIG. 6D illustrates a system 660 including a blockchain, according to example embodiments. Referring to the example of FIG. 6D, an application programming interface (API) gateway 662 provides a common interface for accessing blockchain logic (e.g., smart contract 630 or other chaincode) and data (e.g., distributed ledger, etc.). In this example, the API gateway 662 is a common interface for performing transactions (invoke, queries, etc.) on the blockchain by connecting one or more entities 652 and 656 to a blockchain peer (i.e., server 654). Here, the server 654 is a blockchain network peer component that holds a copy of the world state and a distributed ledger allowing clients 652 and 656 to query data on the world state as well as submit transactions into the blockchain network where, depending on the smart contract 630 and endorsement policy, endorsing peers will run the smart contracts 630.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components.

Figure 7B:
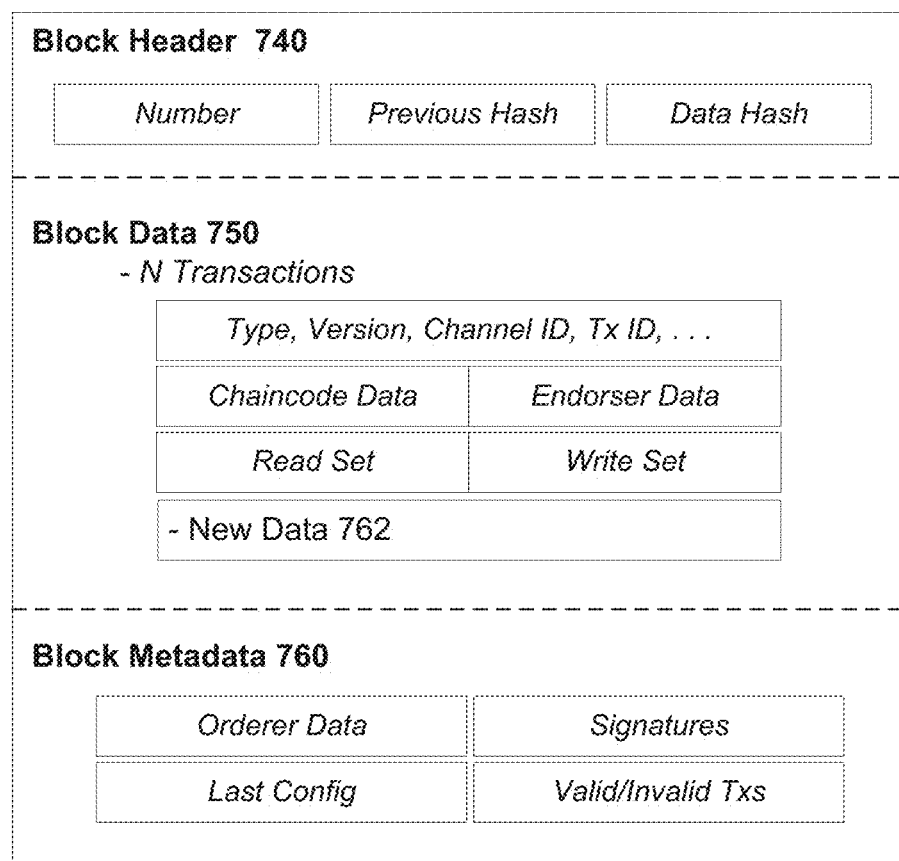
FIG. 7B illustrates contents of a new data block, according to example embodiments.

FIG. 7A illustrates a process 700 of a new block being added to a distributed ledger 720, according to example embodiments, and FIG. 7B illustrates contents of a new data block structure 730 for blockchain, according to example embodiments. Referring to FIG. 7A, clients (not shown) may submit transactions to blockchain nodes 711, 712, and/or 713. Clients may be instructions received from any source to enact activity on the blockchain 720. As an example, clients may be applications that act on behalf of a requester, such as a device, person or entity to propose transactions for the blockchain. The plurality of blockchain peers (e.g., blockchain nodes 711, 712, and 713) may maintain a state of the blockchain network and a copy of the distributed ledger 720. Different types of blockchain nodes/peers may be present in the blockchain network including endorsing peers which simulate and endorse transactions proposed by clients and committing peers which verify endorsements, validate transactions, and commit transactions to the distributed ledger 720. In this example, the blockchain nodes 711, 712, and 713 may perform the role of endorser node, committer node, or both.

The distributed ledger 720 includes a blockchain which stores immutable, sequenced records in blocks, and a state database 724 (current world state) maintaining a current state of the blockchain 722. One distributed ledger 720 may exist per channel and each peer maintains its own copy of the distributed ledger 720 for each channel of which they are a member. The blockchain 722 is a transaction log, structured as hash-linked blocks where each block contains a sequence of N transactions. Blocks may include various components such as shown in FIG. 7B. The linking of the blocks (shown by arrows in FIG. 7A) may be generated by adding a hash of a prior block's header within a block header of a current block. In this way, all transactions on the blockchain 722 are sequenced and cryptographically linked together preventing tampering with blockchain data without breaking the hash links. Furthermore, because of the links, the latest block in the blockchain 722 represents every transaction that has come before it. The blockchain 722 may be stored on a peer file system (local or attached storage), which supports an append-only blockchain workload.

The current state of the blockchain 722 and the distributed ledger 722 may be stored in the state database 724. Here, the current state data represents the latest values for all keys ever included in the chain transaction log of the blockchain 722. Chaincode invocations execute transactions against the current state in the state database 724. To make these chaincode interactions extremely efficient, the latest values of all keys are stored in the state database 724. The state database 724 may include an indexed view into the transaction log of blockchain 722, it can therefore be regenerated from the chain at any time. The state database 724 may automatically get recovered (or generated if needed) upon peer startup, before transactions are accepted.

Endorsing nodes receive transactions from clients and endorse the transaction based on simulated results. Endorsing nodes hold smart contracts which simulate the transaction proposals. When an endorsing node endorses a transaction, the endorsing nodes creates a transaction endorsement which is a signed response from the endorsing node to the client application indicating the endorsement of the simulated transaction. The method of endorsing a transaction depends on an endorsement policy which may be specified within chaincode. An example of an endorsement policy is "the majority of endorsing peers must endorse the transaction". Different channels may have different endorsement policies. Endorsed transactions are forward by the client application to ordering service 710.

The ordering service 710 accepts endorsed transactions, orders them into a block, and delivers the blocks to the committing peers. For example, the ordering service 710 may initiate a new block when a threshold of transactions has been reached, a timer times out, or another condition. In the example of FIG. 7A, blockchain node 712 is a committing peer that has received a new data new data block 730 for storage on blockchain 720. The first block in the blockchain may be referred to as a genesis block which includes information about the blockchain, its members, the data stored therein, etc.

The ordering service 710 may be made up of a cluster of orderers. The ordering service 710 does not process transactions, smart contracts, or maintain the shared ledger. Rather, the ordering service 710 may accept the endorsed transactions and specifies the order in which those transactions are committed to the distributed ledger 720. The architecture of the blockchain network may be designed such that the specific implementation of 'ordering' (e.g., Solo, Kafka, BFT, etc.) becomes a pluggable component.

Transactions are written to the distributed ledger 720 in a consistent order. The order of transactions is established to ensure that the updates to the state database 724 are valid when they are committed to the network. Unlike a cryptocurrency blockchain system (e.g., Bitcoin, etc.) where ordering occurs by solving of a cryptographic puzzle, or mining, in this example the parties of distributed ledger 720 may choose the ordering mechanism that best suits that network.

When the ordering service 710 initializes a new data block 730, the new data block 730 may be broadcast to committing peers (e.g., blockchain nodes 711, 712, and 713). In response, each committing peer validates the transaction within the new data block 730 by checking to make sure that the read set and the write set still match the current world state in the state database 724. For example, the committing peer may determine whether the read data that existed when the endorsers simulated the transaction is identical to the current world state in the state database 724. When the committing peer validates the transaction, the transaction is written to the blockchain 722 on the distributed ledger 720, and the state database 724 is updated with the write data from the read-write set. If a transaction fails, that is, if the committing peer finds that the read-write set does not match the current world state in the state database 724, the transaction ordered into a block will still be included in that block, but it will be marked as invalid, and the state database 724 will not be updated.

Referring to FIG. 7B, a new data block 730 (also referred to as a data block) that is stored on the blockchain 722 of the distributed ledger 720 may include multiple data segments such as a block header 740, block data 750, and block metadata 760. It should be appreciated that the various depicted blocks and their contents, such as new data block 730 and its contents. shown in FIG. 7B are merely examples and are not meant to limit the scope of the example embodiments. The new data block 730 may store transactional information of N transaction(s) (e.g., 1, 10, 100, 500, 1000, 2000, 3000, etc.) within the block data 750. The new data block 730 may also include a link to a previous block (e.g., on the blockchain 722 in FIG. 7A) within the block header 740. In particular, the block header 740 may include a hash of a previous block's header. The block header 740 may also include a unique block number, a hash of the block data 750 of the new data block 730, and the like. The block number of the new data block 730 may be unique and assigned in various orders, such as an incremental/sequential order starting from zero.

The block data 750 may store transactional information of each transaction that is recorded within the new data block 730. For example, the transaction data may include one or more of a type of the transaction, a version, a timestamp, a channel ID of the distributed ledger 720, a transaction ID, an epoch, a payload visibility, a chaincode path (deploy tx), a chaincode name, a chaincode version, input (chaincode and functions), a client (creator) identify such as a public key and certificate, a signature of the client, identities of endorsers, endorser signatures, a proposal hash, chaincode events, response status, namespace, a read set (list of key and version read by the transaction, etc.), a write set (list of key and value, etc.), a start key, an end key, a list of keys, a Merkel tree query summary, and the like. The transaction data may be stored for each of the N transactions.

In some embodiments, the block data 750 may also store new data 762 which adds additional information to the hash-linked chain of blocks in the blockchain 722. The additional information includes one or more of the steps, features, processes and/or actions described or depicted herein. Accordingly, the new data 762 can be stored in an immutable log of blocks on the distributed ledger 720. Some of the benefits of storing such new data 762 are reflected in the various embodiments disclosed and depicted herein. Although in FIG. 7B the new data 762 is depicted in the block data 750 but could also be located in the block header 740 or the block metadata 760.

The block metadata 760 may store multiple fields of metadata (e.g., as a byte array, etc.). Metadata fields may include signature on block creation, a reference to a last configuration block, a transaction filter identifying valid and invalid transactions within the block, last offset persisted of an ordering service that ordered the block, and the like. The signature, the last configuration block, and the orderer metadata may be added by the ordering service 710. Meanwhile, a committer of the block (such as blockchain node 712) may add validity/invalidity information based on an endorsement policy, verification of read/write sets, and the like. The transaction filter may include a byte array of a size equal to the number of transactions in the block data 750 and a validation code identifying whether a transaction was valid/invalid.

Figure 7C:
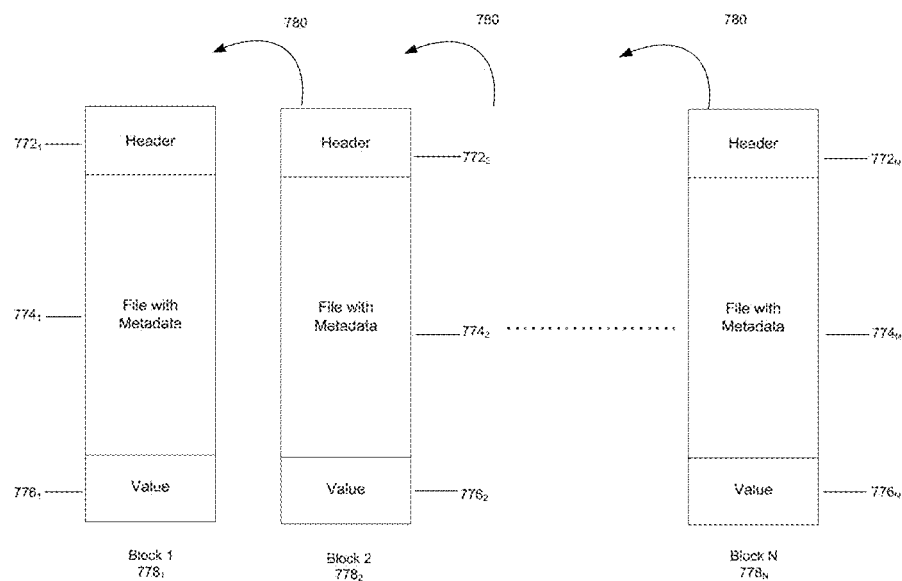
FIG. 7C illustrates a blockchain for digital content, according to example embodiments.

FIG. 7C illustrates an embodiment of a blockchain 770 for digital content in accordance with the embodiments described herein. The digital content may include one or more files and associated information. The files may include media, images, video, audio, text, links, graphics, animations, web pages, documents, or other forms of digital content. The immutable, append-only aspects of the blockchain serve as a safeguard to protect the integrity, validity, and authenticity of the digital content, making it suitable use in legal proceedings where admissibility rules apply or other settings where evidence is taken in to consideration or where the presentation and use of digital information is otherwise of interest. In this case, the digital content may be referred to as digital evidence.

The blockchain may be formed in various ways. In one embodiment, the digital content may be included in and accessed from the blockchain itself. For example, each block of the blockchain may store a hash value of reference information (e.g., header, value, etc.) along the associated digital content. The hash value and associated digital content may then be encrypted together. Thus, the digital content of each block may be accessed by decrypting each block in the blockchain, and the hash value of each block may be used as a basis to reference a previous block. This may be illustrated as follows:

| Block 1 | Block 2 | ... | Block N |
|---|---|---|---|
| Hash Value 1 | Hash Value 2 | | Hash Value N |
| Digital Content 1 | Digital Content 2 | | Digital Content N |

In one embodiment, the digital content may be not included in the blockchain. For example, the blockchain may store the encrypted hashes of the content of each block without any of the digital content. The digital content may be stored in another storage area or memory address in association with the hash value of the original file. The other storage area may be the same storage device used to store the blockchain or may be a different storage area or even a separate relational database. The digital content of each block may be referenced or accessed by obtaining or querying the hash value of a block of interest and then looking up that has value in the storage area, which is stored in correspondence with the actual digital content. This operation may be performed, for example, a database gatekeeper. This may be illustrated as follows:

| Blockchain | Storage Area |
|---|---|
| Block 1 Hash Value | Block 1 Hash Value ... Content |
| . | . |
| . | . |
| . | . |
| Block N Hash Value | Block N Hash Value ... Content |

In the example embodiment of FIG. 7C, the blockchain 770 includes a number of blocks $778_1$, $778_2$, ... $778_N$ cryptographically linked in an ordered sequence, where N≥1. The encryption used to link the blocks $778_1$, $778_2$, ... $778_N$ may be any of a number of keyed or un-keyed Hash functions. In one embodiment, the blocks $778_1$, $778_2$, ... $778_N$ are subject to a hash function which produces n-bit alphanumeric outputs (where n is 256 or another number) from inputs that are based on information in the blocks. Examples of such a hash function include, but are not limited to, a SHA-type (SHA stands for Secured Hash Algorithm) algorithm, Merkle-Damgard algorithm, HAIFA algorithm, Merkle-tree algorithm, nonce-based algorithm, and a non-collision-resistant PRF algorithm. In another embodiment, the blocks $778_1$, $778_2$, ..., $778_N$ may be cryptographically linked by a function that is different from a hash function. For purposes of illustration, the following description is made with reference to a hash function, e.g., SHA-2.

Each of the blocks $778_1$, $778_2$, ..., $778_N$ in the blockchain includes a header, a version of the file, and a value. The header and the value are different for each block as a result of hashing in the blockchain. In one embodiment, the value may be included in the header. As described in greater detail below, the version of the file may be the original file or a different version of the original file.

The first block $778_1$ in the blockchain is referred to as the genesis block and includes the header $772_1$, original file $774_1$, and an initial value $776_1$. The hashing scheme used for the genesis block, and indeed in all subsequent blocks, may vary. For example, all the information in the first block $778_1$ may be hashed together and at one time, or each or a portion of the information in the first block $778_1$ may be separately hashed and then a hash of the separately hashed portions may be performed.

The header $772_1$ may include one or more initial parameters, which, for example, may include a version number, timestamp, nonce, root information, difficulty level, consensus protocol, duration, media format, source, descriptive keywords, and/or other information associated with original file $774_1$ and/or the blockchain. The header $772_1$ may be generated automatically (e.g., by blockchain network managing software) or manually by a blockchain participant. Unlike the header in other blocks $778_2$ to $778_N$ in the blockchain, the header $772_1$ in the genesis block does not reference a previous block, simply because there is no previous block.

The original file $774_1$ in the genesis block may be, for example, data as captured by a device with or without processing prior to its inclusion in the blockchain. The original file $774_1$ is received through the interface of the system from the device, media source, or node. The original file $774_1$ is associated with metadata, which, for example, may be generated by a user, the device, and/or the system processor, either manually or automatically. The metadata may be included in the first block $778_1$ in association with the original file $774_1$.

The value $776_1$ in the genesis block is an initial value generated based on one or more unique attributes of the original file $774_1$. In one embodiment, the one or more unique attributes may include the hash value for the original file $774_1$, metadata for the original file $774_1$, and other information associated with the file. In one implementation, the initial value $776_1$ may be based on the following unique attributes:

1) SHA-2 computed hash value for the original file
2) originating device ID
3) starting timestamp for the original file
4) initial storage location of the original file
5) blockchain network member ID for software to currently control the original file and associated metadata The other blocks $778_2$ to $778_N$ in the blockchain also have headers, files, and values. However, unlike the first block $772_1$, each of the headers $772_2$ to $772_N$ in the other blocks includes the hash value of an immediately preceding block. The hash value of the immediately preceding block may be just the hash of the header of the previous block or may be the hash value of the entire previous block. By including the hash value of a preceding block in each of the remaining blocks, a trace can be performed from the Nth block back to the genesis block (and the associated original file) on a block-by-block basis, as indicated by arrows 780, to establish an auditable and immutable chain-of-custody.

Each of the header $772_2$ to $772_N$ in the other blocks may also include other information, e.g., version number, timestamp, nonce, root information, difficulty level, consensus protocol, and/or other parameters or information associated with the corresponding files and/or the blockchain in general.

The files $774_2$ to $774_N$ in the other blocks may be equal to the original file or may be a modified version of the original file in the genesis block depending, for example, on the type of processing performed. The type of processing performed may vary from block to block. The processing may involve, for example, any modification of a file in a preceding block, such as redacting information or otherwise changing the content of, taking information away from, or adding or appending information to the files.

Additionally, or alternatively, the processing may involve merely copying the file from a preceding block, changing a storage location of the file, analyzing the file from one or more preceding blocks, moving the file from one storage or memory location to another, or performing action relative to the file of the blockchain and/or its associated metadata. Processing which involves analyzing a file may include, for example, appending, including, or otherwise associating various analytics, statistics, or other information associated with the file.

The values in each of the other blocks $776_2$ to $776_N$ in the other blocks are unique values and are all different as a result of the processing performed. For example, the value in any one block corresponds to an updated version of the value in the previous block. The update is reflected in the hash of the block to which the value is assigned. The values of the blocks therefore provide an indication of what processing was performed in the blocks and also permit a tracing through the blockchain back to the original file. This tracking confirms the chain-of-custody of the file throughout the entire blockchain.

For example, consider the case where portions of the file in a previous block are redacted, blocked out, or pixelated in order to protect the identity of a person shown in the file. In this case, the block including the redacted file will include metadata associated with the redacted file, e.g., how the redaction was performed, who performed the redaction, timestamps where the redaction(s) occurred, etc. The metadata may be hashed to form the value. Because the metadata for the block is different from the information that was hashed to form the value in the previous block, the values are different from one another and may be recovered when decrypted.

Figure 7D:
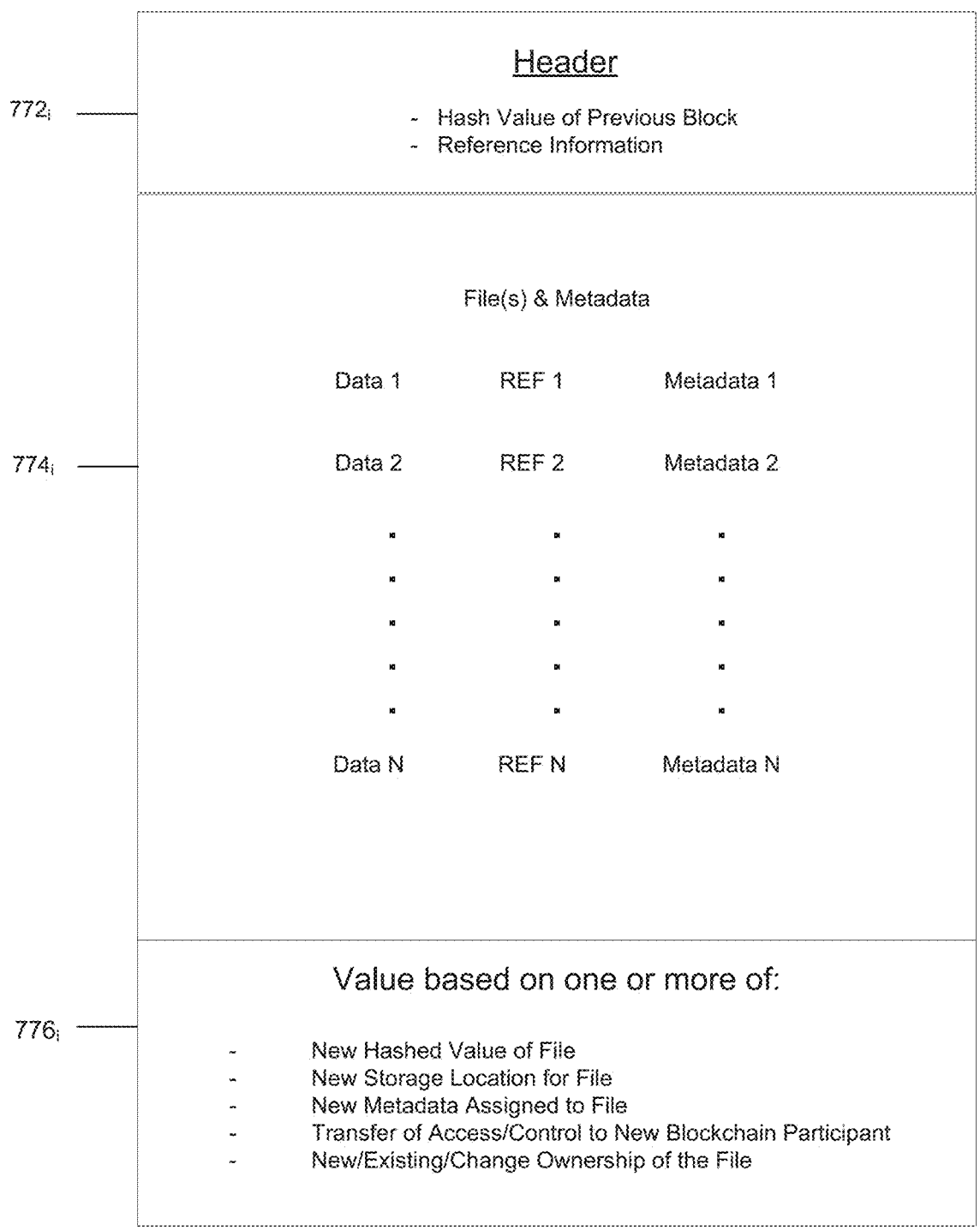
FIG. 7D illustrates a block which may represent the structure of blocks in the blockchain, according to example embodiments.

In one embodiment, the value of a previous block may be updated (e.g., a new hash value computed) to form the value of a current block when any one or more of the following occurs. The new hash value may be computed by hashing all or a portion of the information noted below, in this example embodiment.

a) new SHA-2 computed hash value if the file has been processed in any way (e.g., if the file was redacted, copied, altered, accessed, or some other action was taken)
b) new storage location for the file
c) new metadata identified associated with the file
d) transfer of access or control of the file from one blockchain participant to another blockchain participant FIG. 7D illustrates an embodiment of a block which may represent the structure of the blocks in the blockchain 790 in accordance with one embodiment. The block, $Block_i$, includes a header $772_i$, a file $774_i$, and a value $776_i$.

The header $772_i$ includes a hash value of a previous block $Block_{i-1}$ and additional reference information, which, for example, may be any of the types of information (e.g., header information including references, characteristics, parameters, etc.) discussed herein. All blocks reference the hash of a previous block except, of course, the genesis block. The hash value of the previous block may be just a hash of the header in the previous block or a hash of all or a portion of the information in the previous block, including the file and metadata.

The file $774_i$ includes a plurality of data, such as Data 1, Data 2, ..., Data N in sequence. The data are tagged with metadata Metadata 1, Metadata 2, ..., Metadata N which describe the content and/or characteristics associated with the data. For example, the metadata for each data may include information to indicate a timestamp for the data, process the data, keywords indicating the persons or other content depicted in the data, and/or other features that may be helpful to establish the validity and content of the file as a whole, and particularly its use a digital evidence, for example, as described in connection with an embodiment discussed below. In addition to the metadata, each data may be tagged with reference $REF_1$, $REF_2$, ..., $REF_N$ to a previous data to prevent tampering, gaps in the file, and sequential reference through the file.

Once the metadata is assigned to the data (e.g., through a smart contract), the metadata cannot be altered without the hash changing, which can easily be identified for invalidation. The metadata, thus, creates a data log of information that may be accessed for use by participants in the blockchain.

The value $776_i$ is a hash value or other value computed based on any of the types of information previously discussed. For example, for any given block $Block_i$, the value for that block may be updated to reflect the processing that was performed for that block, e.g., new hash value, new storage location, new metadata for the associated file, transfer of control or access, identifier, or other action or information to be added. Although the value in each block is shown to be separate from the metadata for the data of the file and header, the value may be based, in part or whole, on this metadata in another embodiment.

Once the blockchain 770 is formed, at any point in time, the immutable chain-of-custody for the file may be obtained by querying the blockchain for the transaction history of the values across the blocks. This query, or tracking procedure, may begin with decrypting the value of the block most currently included (e.g., last ($N^{th}$) block), and then continuing to decrypt the value of the other blocks until the genesis block is reached and the original file is recovered. Decryption may involve decrypting the headers and files and associated metadata at each block, as well.

Decryption is performed based on the type of encryption that took place in each block. This may involve the use of private keys, public keys, or a public key-private key pair. For example, when asymmetric encryption is used, blockchain participants or a processor in the network may generate a public key and private key pair using a predetermined algorithm. The public key and private key are associated with each other through some mathematical relationship. The public key may be distributed publicly to serve as an address to receive messages from other users, e.g., an IP address or home address. The private key is kept secret and used to digitally sign messages sent to other blockchain participants. The signature is included in the message so that the recipient can verify using the public key of the sender. This way, the recipient can be sure that only the sender could have sent this message.

Generating a key pair may be analogous to creating an account on the blockchain, but without having to actually register anywhere. Also, every transaction that is executed on the blockchain is digitally signed by the sender using their private key. This signature ensures that only the owner of the account can track and process (if within the scope of permission determined by a smart contract) the file of the blockchain.

Figure 8:
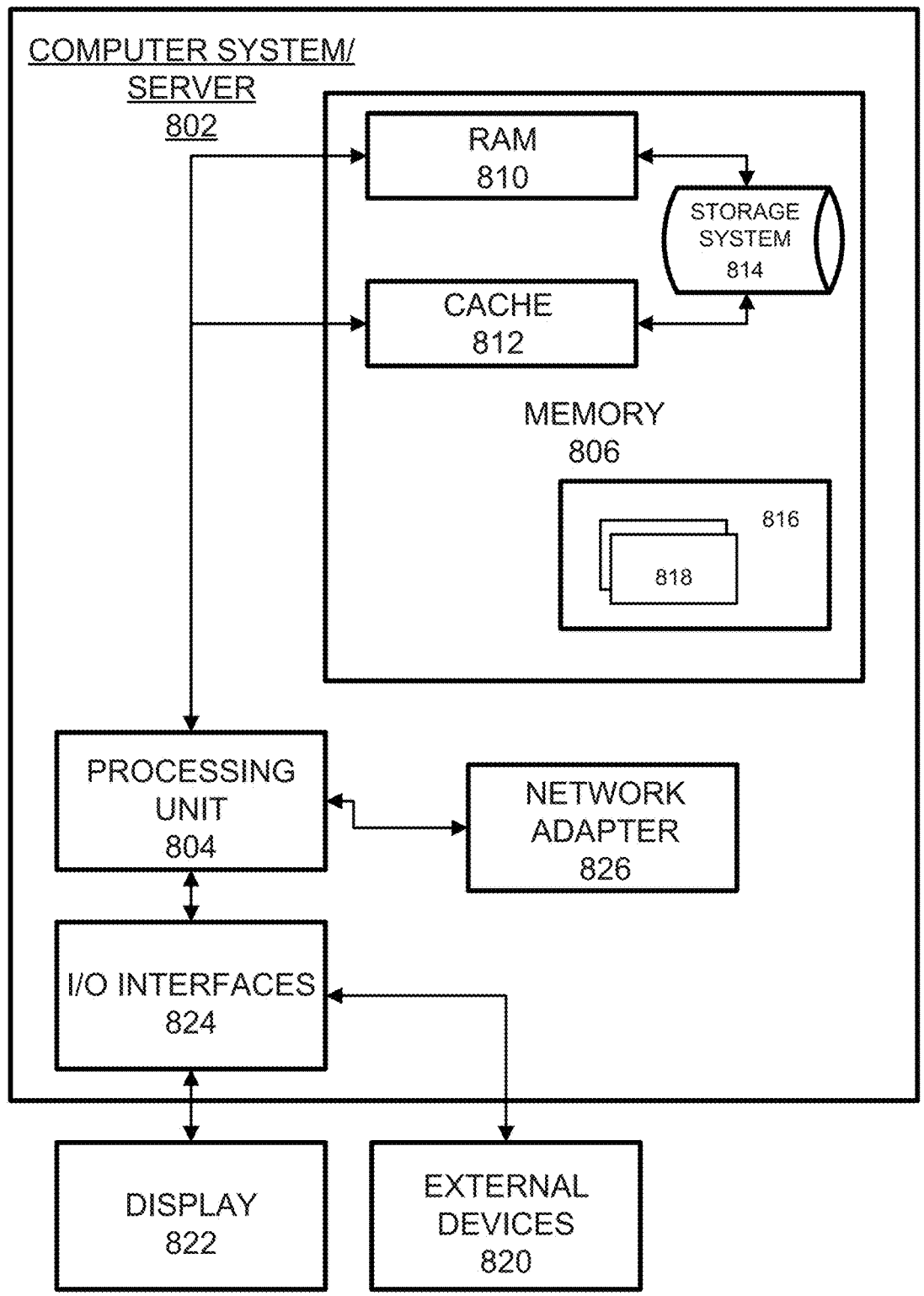
FIG. 8 illustrates an example system that supports one or more of the example embodiments.

FIG. 8 illustrates an example system 800 that supports one or more of the example embodiments described and/or depicted herein. The system 800 comprises a computer system/server 802, which is operational with numerous other general purpose or special purpose computing system environments or configurations. Examples of well-known computing systems, environments, and/or configurations that may be suitable for use with computer system/server 802 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 802 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 802 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 802 in cloud computing node 800 is shown in the form of a general-purpose computing device. The components of computer system/server 802 may include, but are not limited to, one or more processors or processing units 804, a system memory 806, and a bus that couples various system components including system memory 806 to processor 804.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 802 typically includes a variety of computer system readable media. Such media may be any available media that is accessible by computer system/server 802, and it includes both volatile and non-volatile media, removable and non-removable media. System memory 806, in one embodiment, implements the flow diagrams of the other figures. The system memory 806 can include computer system readable media in the form of volatile memory, such as random-access memory (RAM) 810 and/or cache memory 812. Computer system/server 802 may further include other removable/non-removable, volatile/non-volatile computer system storage media. By way of example only, storage system 814 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 806 may include at least one program product having a set (e.g., at least one) of program modules that are configured to carry out the functions of various embodiments of the application.

Program/utility 816, having a set (at least one) of program modules 818, may be stored in memory 806 by way of example, and not limitation, as well as an operating system, one or more application programs, other program modules, and program data. Each of the operating system, one or more application programs, other program modules, and program data or some combination thereof, may include an implementation of a networking environment. Program modules 818 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 802 may also communicate with one or more external devices 820 such as a keyboard, a pointing device, a display 822, etc.; one or more devices that enable a user to interact with computer system/server 802; and/or any devices (e.g., network card, modem, etc.) that enable computer system/server 802 to communicate with one or more other computing devices. Such communication can occur via I/O interfaces 824. Still yet, computer system/server 802 can communicate with one or more networks such as a local area network (LAN), a general wide area network (WAN), and/or a public network (e.g., the Internet) via network adapter 826. As depicted, network adapter 826 communicates with the other components of computer system/server 802 via a bus. It should be understood that although not shown, other hardware and/or software components could be used in conjunction with computer system/server 802. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

The methods, processes, and/or operations described herein may be performed by code or instructions to be executed by a computer, processor, controller, or other signal processing device. The code or instructions may be stored in a non-transitory computer-readable medium in accordance with one or more embodiments. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods described herein.

Also, another embodiment may include a computer-readable medium, e.g., a non-transitory computer-readable medium, for storing the code or instructions described above. The computer-readable medium may be a volatile or non-volatile memory or other storage device, which may be removably or fixedly coupled to the computer, processor, controller, or other signal processing device which is to execute the code or instructions for performing the method embodiments described herein.

The processors, managers, smart contracts, chaincode, or other processing features of the embodiments disclosed herein may be implemented in logic which, for example, may include hardware, software, or both. When implemented at least partially in hardware, the processors, managers, smart contracts, chaincode, or other processing features may be, for example, any one of a variety of integrated circuits including but not limited to an application-specific integrated circuit, a field-programmable gate array, a combination of logic gates, a system-on-chip, a microprocessor, or another type of processing or control circuit.

When implemented in at least partially in software, the processors, managers, smart contracts, chaincode, or other processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein. The term "device unit data" may be or include card unique data or other type of unique device-specific data.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A processor system for managing a node in a blockchain network, the processor system, comprising:
one or more processors that when executing one or more instructions stored in an associated memory are configured:
generate a proposal to perform a ledger operation to modify a state database that maintains a world state of a blockchain ledger of the node,
submit the proposal to a plurality of other nodes of the blockchain operation for a consensus operation,
receive a decision indicating that the plurality of other nodes have reached a consensus to allow an execution of the ledger operation, and
modify the state database in response to the execution of the ledger operation.

2. The processor system of claim 1, wherein the ledger operation changes a configuration of an index of the state database.

3. The system of claim 2, wherein the ledger operation is one of an operation to:
create an index for an attribute, or
update an index of an attribute already in the ledger.

4. The system of claim 2, wherein the ledger operation is one of an operation to:
copy a structure of an index from another node of the plurality of other nodes,
share a structure of an index from another node of the plurality of other nodes without an update of the state database,
read an index of an attribute already in a ledger of another node of the plurality of other nodes, or
update an index of an attribute already in a ledger of another node of the plurality of other nodes.

5. The system of claim 1, wherein the one or more processors are configured to:
generate the proposal in response to a query from a client application associated with the node.

6. The system of claim 1 one or more processors are configured to:
check the proposal against a privacy policy of the node, and perform or terminate the ledger operation based on the privacy policy.

7. The system of claim 1, one or more processors are configured to:
   send information indicative of a first parameter to the plurality of second nodes, the first parameter related to an index of an attribute that corresponds with the ledger operation,
   determine that plurality of the second nodes each have a ledger that includes an index for the attribute, the index in the ledger of each of the plurality of second nodes including a second parameter different from the first parameter, and
   obtain consensus among the first node and the plurality of second nodes as to a third parameter to be used for the index of the attribute in the first node,
   wherein the ledger operation is one of an operation to:
   create the index of the attribute in the ledger of the first node based on the third parameter, or
   update the index of the attribute in the ledger of the first node based on the third parameter.

8. The system of claim 7, wherein the third parameter is one of:
   the same as first parameter,
   the same as second parameter, or
   different than the first parameter and the second parameter.

9. A method, comprising:
   generating, by one or more processors, a proposal to perform a ledger operation to modify a state database of a node in a blockchain network, the state database maintaining a world state of a blockchain ledger of the node;
   submitting, by the one or more processors, the proposal to a plurality of other nodes of the blockchain operation for a consensus operation;
   receiving, by the one or more processors, a decision indicating that the plurality of other nodes have reached a consensus to allow executing of the ledger operation; and
   modify, by the one or more processors, the state database in response to the executing of the ledger operation.

10. The method of claim 9, wherein the ledger operation changes a configuration of an index of the state database.

11. The method of claim 10, wherein the ledger operation is one of an operation to:
    create an index for an attribute, or
    update an index of an attribute already in the ledger.

12. The method of claim 10, wherein the ledger operation is one of an operation to:
    copy a structure of an index from another node of the plurality of other nodes,
    share a structure of an index from another node of the plurality of other nodes without an update of the state database,
    read an index of an attribute already in a ledger of another node of the plurality of other nodes, or
    update an index of an attribute already in a ledger of another node of the plurality of other nodes.

13. The method of claim 9, wherein the generating the proposal further comprises:
    generating the proposal in response to a query from a client application associated with the node.

14. The method of claim 9, further comprising:
    checking the proposal against a privacy policy of the node, and
    performing or terminating the ledger operation based on the privacy policy.

15. The method of claim 9, further comprising:
    sending information indicative of a first parameter to the plurality of second nodes, the first parameter related to an index of an attribute that corresponds with the ledger operations;
    determining that plurality of the second nodes each have a ledger that includes an index for the attribute, the index in the ledger of each of the plurality of second nodes including a second parameter different from the first parameter; and
    obtaining consensus among the first node and the plurality of second nodes as to a third parameter to be used for the index of the attribute in the first node,
    wherein the ledger operation is one of an operation to:
    create the index of the attribute in the ledger of the first node based on the third parameter, or
    update the index of the attribute in the ledger of the first node based on the third parameter.

16. The method of claim 15, wherein the third parameter is one of:
    the same as first parameter,
    the same as second parameter, or
    different than the first parameter and the second parameter.

17. A non-transitory computer-readable medium storing one or more instructions that when executed by one or more processors cause the one or more processors to:
    generate a proposal to perform a ledger operation to modify a state database that maintains a world state of a blockchain ledger of the node;
    submit the proposal to a plurality of other nodes of the blockchain operation for a consensus operation;
    receive a decision indicating that the plurality of other nodes have reached a consensus to allow an execution of the ledger operation; and
    modify the state database in response to the execution of the ledger operation.

18. The medium of claim 17, wherein the ledger operation changes a configuration of an index of the state database.

19. The medium of claim 18, wherein the ledger operation is one of an operation to:
    create an index for an attribute,
    update an index of an attribute already in the ledger,
    copy a structure of an index from another node of the plurality of other nodes,
    share a structure of an index from another node of the plurality of other nodes without an update of the state database,
    read an index of an attribute already in a ledger of another node of the plurality of other nodes, or
    update an index of an attribute already in a ledger of another node of the plurality of other nodes.

20. The medium of claim 17, wherein the one or more instructions further cause the one or more processors to:
    check the proposal against a privacy policy, and
    perform or terminate the ledger operation based on the privacy policy.

* * * * *